US011727289B2

(12) United States Patent
Katz et al.

(10) Patent No.: US 11,727,289 B2
(45) Date of Patent: Aug. 15, 2023

(54) ITERATIVE GENERATION OF TOP QUALITY PLANS IN AUTOMATED PLAN GENERATION FOR ARTIFICIAL INTELLIGENCE APPLICATIONS AND THE LIKE

(71) Applicant: International Business Machines Corporation, Armonk, NY (US)

(72) Inventors: Michael Katz, Elmsford, NY (US); Shirin Sohrabi Araghi, Port Chester, NY (US); Octavian Udrea, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 15/971,911

(22) Filed: May 4, 2018

(65) Prior Publication Data

US 2019/0340525 A1    Nov. 7, 2019

(51) Int. Cl.
*G06N 5/045* (2023.01)
*G06F 8/30* (2018.01)
*G05B 19/042* (2006.01)
*G05B 13/04* (2006.01)

(52) U.S. Cl.
CPC ........... *G06N 5/045* (2013.01); *G05B 13/041* (2013.01); *G05B 19/0426* (2013.01); *G06F 8/31* (2013.01)

(58) Field of Classification Search
None
See application file for complete search history.

(56) References Cited

U.S. PATENT DOCUMENTS

| 5,392,382 | A | | 2/1995 | Schoppers | |
|---|---|---|---|---|---|
| 5,680,603 | A | * | 10/1997 | Bhargava | G06F 16/24544 |
| 5,889,926 | A | * | 3/1999 | Bourne | B25J 9/1666 |
| | | | | | 700/255 |
| 7,167,852 | B1 | * | 1/2007 | Ahmed | G06F 16/28 |
| | | | | | 707/714 |
| 7,360,201 | B2 | | 4/2008 | Srivastava | |

(Continued)

OTHER PUBLICATIONS

Weixiong Zhang, "Representation of assembly and automatic robot planning by Petri net", IEEE Transactions on Systems, Man, and Cybernetics 19, No. 2 (1989): 418-422.

(Continued)

*Primary Examiner* — Jason D Mitchell
(74) *Attorney, Agent, or Firm* — Caleb Wilkes; Otterstedt & Kammer PLLC

(57) ABSTRACT

A method for improving performance of at least one hardware processor solving a top-k planning problem includes obtaining, in a memory coupled to the at least one processor, a specification of the planning problem in a planning language; obtaining, in a first iteration carried out by the at least one processor, at least one solution to the planning problem; and modifying the planning problem, in the first iteration carried out by the at least one processor, to forbid the at least one solution. The method further includes repeating, by the at least one processor, the obtaining of the at least one solution and the modifying to forbid the at least one solution, for a plurality of additional iterations, after the first iteration, until a desired number, k, of solutions to the planning problem are found or until no further solutions exist, whichever comes first.

13 Claims, 11 Drawing Sheets

(56) References Cited

U.S. PATENT DOCUMENTS

| | | | |
|---|---|---|---|
| 7,370,022 | B2 | 5/2008 | Gupta |
| 7,617,230 | B2 | 11/2009 | Srivastava |
| 8,370,812 | B2 | 2/2013 | Feblowitz |
| 9,135,053 | B2 | 9/2015 | Goodwin |
| 9,286,032 | B2 | 3/2016 | Feblowitz |
| 9,697,467 | B2 | 7/2017 | Riabov |
| 9,740,978 | B2* | 8/2017 | Hassanzadeh ......... G06N 5/022 |
| 9,747,550 | B2 | 8/2017 | Hassanzadeh |
| 9,785,755 | B2 | 10/2017 | Riabov |
| 10,013,656 | B1* | 7/2018 | Ciarlini ...................... G06F 9/46 |
| 2007/0022073 | A1* | 1/2007 | Gupta ..................... G06N 5/022 |
| | | | 706/45 |
| 2007/0250331 | A1 | 10/2007 | Liu |
| 2008/0071716 | A1* | 3/2008 | Anderson ................ G06N 5/04 |
| | | | 706/45 |
| 2008/0222087 | A1* | 9/2008 | Balmin ............... G06F 16/8365 |
| 2008/0300706 | A1* | 12/2008 | Ruml ...................... G06Q 10/04 |
| | | | 700/100 |
| 2011/0029508 | A1* | 2/2011 | Al-Omari ......... G06F 16/24542 |
| | | | 707/718 |
| 2012/0030273 | A1* | 2/2012 | Allen ...................... G06F 16/16 |
| | | | 709/203 |
| 2014/0282359 | A1 | 9/2014 | Feblowitz |
| 2015/0149440 | A1* | 5/2015 | Bornea ............. G06F 16/24545 |
| | | | 707/719 |
| 2015/0339580 | A1* | 11/2015 | Riabov .................. G16H 50/70 |
| | | | 706/46 |
| 2015/0339582 | A1* | 11/2015 | Riabov ................... G06F 7/523 |
| | | | 706/11 |
| 2016/0117602 | A1 | 4/2016 | Hassanzadeh |
| 2017/0075859 | A1 | 3/2017 | Bnayahu |
| 2017/0147923 | A1 | 5/2017 | Riabov |
| 2021/0004741 | A1* | 1/2021 | Katz ................ G06Q 10/06311 |
| 2021/0073226 | A1* | 3/2021 | Chavan ............... G06F 16/9024 |

OTHER PUBLICATIONS

Avrim L Blum et al., "Fast planning through planning graph analysis", Artificial Intelligence, vol. 90, Issues 1-2, Feb. 1997, pp. 281-300.

Tuan Anh Nguyen et al., "Generating diverse plans to handle unknown and partially known user preferences", Artificial Intelligence (AU), vol. 190, Oct. 2012, pp. 1-31.

Aljazzar, H et al., "K*: A heuristic search algorithm for finding the k shortest paths", Artificial Intelligence 175(18), 2129-2154.

Alkhazraji, Y. et al., "Metis: Arming fast downward with pruning and incremental computation", In the 8th International Planning Competition (IPC-8): 2014 planner abstracts, (88-92).

Backstrom, C. et al., "Complexity results for SAS+ planning", Computational Intelligence 11(4), 1995, (625-655).

Backstrom, C. "Computational aspects of reordering plans", Journal of Artificial Intelligence Research 9 (99-137) 1998.

Bryce, D. "Landmark-based plan distance measures for diverse planning", In Proceedings of the 24th International Conference on Automated Planning and Scheduling (ICAPS), 2014 (56-64).

Coman, A. et al., "Generating diverse plans using quantitative and qualitative plan distance metrics", In Proceedings of the 25th National Conference on Artificial Intelligence (AAAI), 2011, 946-951.

Domshlak, C. et al., "Symmetry breaking in deterministic planning as forward search: Orbit space search algorithm", Technical Report IS/IE-2015-03, 2015 Technion, Haifa, 6 pages.

Fox, M., et al., "Plan stability: Replanning versus plan repair", In Proceedings of the 16th International Conference on Automated Planning and Scheduling (ICAPS), 2006, 212-221.

Haslum, P., et al., "Domain-independent construction of pattern database heuristics for cost-optimal planning", In Proceedings of the 22nd AAAI Conference on Artificial Intelligence (AAAI 2007), 2007, 1007-1012.

Helmert, M., et al., "Landmarks, critical paths and abstractions: What's the difference anyway?", In Proceedings of the 19th International Conference on Automated Planning and Scheduling (ICAPS 2009), 2009, 162-169.

Helmert, M. "The fast downward planning system", Journal of Artificial Intelligence Research 26, 2006, 191-246.

Keyder, E. et al., "Soft goals can be compiled away", Journal of Artificial Intelligence Research 36, 2009, 547-556.

Nguyen, T. et al., "Generating diverse plans to handle unknown and partially known user preferences", Artificial Intelligence 190, 2012, 1-31.

Riabov, A. et al., "Planning for stream processing systems", In Proceedings of the 20th National Conference on Artificial Intelligence (AAAI), 2005, 1205-1210.

Riabov, A., et al., "New algorithms for the top-k planning problem", In ICAPS 2014 Scheduling and Planning Applications woRKshop, 10-16.

Shleyfman, A. et al., "Heuristics and symmetries in classical planning", In Proceedings of the 29th AAAI Conference on Artificial Intelligence (AAAI 2015), 2015, 3371-3377.

Sievers, S. et al., "Strengthening canonical pattern databases with structural symmetries", In Proceedings of the 10th Annual Symposium on Combinatorial Search (SoCS 2017), 2017, 91-99.

Sohrabi, S. et al., "Finding diverse high-quality plans for hypothesis generation", In Proceedings of the 22nd European Conference on Artificial Intelligence (ECAI), 2016, 1581-1582.

Sohrabi, S. et al., "An AI planning solution to scenario generation for enterprise risk management", In Proceedings of the 32nd AAAI Conference on Artificial Intelligence (AAAI 2018) 2018, 8 pages.

Sohrabi, S. et al., "Plan recognition as planning revisited", In Proceedings of the 25th International Joint Conference on Artificial Intelligence (IJCAI), 2016, 3258-3264.

Sohrabi, S. et al., "Hypothesis exploration for malware detection using planning", In Proceedings of the 27th National Conference on Artificial Intelligence (AAAI), 2013, 883-889.

Wehrle, M. et al., "About partial order reduction in planning and computer aided verification", In Proceedings of the 22nd International Conference on Automated Planning and Scheduling (ICAPS 2012), 2012, 297-305.

Vallati, M. et al., "The Eighth International Planning Competition; Description of Participant Planners of the Deterministic Track" Booklet, Jun. 2014, 136 pages.

Jandt, T., et al., "b-it-bots RoboCup@Work Team Description Paper", 20th RoboCup International Symposium, Leipzig, 30.06—Apr. 7, 2016, 9 pages.

International Planning Competition 2014 (index.html) Deterministic Part. Listing of information about all competing planners, 2014, 9 pages.

Wikipedia description of Robot Operating System. Downloaded Apr. 24, 2018, https://en.wikipedia.org/wiki/Robot_Operating_System, 10 pages.

Wikipedia description of PSPACE, Downloaded Apr. 9, 2018, https://en.wikipedia.org/wiki/SPACE, 4 pages.

Sohrabi, S., et al., "Scenario Planning for Enterprise Risk Management", Proceedings of Application Showcase Program at the 27th International Conference on Automated Planning and Scheduling (ICAPS-17), 2017, 3 pages.

Cashmore, M., et al., "ROSPlan: Planning in the robot operating system", Proceedings of the 25th International Conference on Automated Planning and Scheduling, 2015, (333-341).

KCL-Planning/ROSPlan Wiki GitHub description of ROSPlan Framework downloaded Apr. 24, 2018, https://github.com/KCL-Planning/ROSPlan/wiki, 1 page.

Manikonda, et al., unpublished U.S. Appl. No. 15/475,551, filed Mar. 31, 2017, Learning Personalized Actionable Domain Models, pp. 1-51, plus 8 sheets of drawings.

Manikonda, et al., unpublished U.S. Appl. No. 15/420,433, filed Jan. 31, 2017, Autonomous Learning of Actionable Models From Unstrutured Data, pp. 1-30, plus 10 sheets of drawings.

Katz, et al., "A Novel Iterative Approach to Top-k Planning",

(56) References Cited

OTHER PUBLICATIONS

Proceedings of the Twenty-Eighth International Conference on Automated Planning and Scheduling (ICAPS 2018) p. 132-140.

* cited by examiner

FIG. 7

Definition 1 (top-k planning problem) *Given a planning task $\Pi = \langle \mathcal{V}, \mathcal{O}, s_0, s_\star, cost \rangle$ and a natural number $k$, find a set of plans $P \subseteq \mathcal{P}_\Pi$ such that:*

*(i) for all plans $\pi \in P$, if there exists a plan $\pi'$ for $\Pi$ with $cost(\pi') < cost(\pi)$, then $\pi' \in P$, and*

*(ii) $|P| \leq k$, with $|P| < k$ implying $P = \mathcal{P}_\Pi$.*

*An instance of the top-k planning problem $\langle \Pi, k \rangle$, is called solvable if $|P| = k$ and unsolvable if $|P| < k$.*

FIG. 8

Algorithm : ITERATIVETOPK($\langle \Pi, k \rangle$)

$P \leftarrow \emptyset; \quad \pi \leftarrow \emptyset; \quad r \leftarrow id$
while $|P| < k$ and no failure occurs
do $\begin{cases} \Pi, r' \leftarrow \text{PLANFORBIDREFORMULATION}(\Pi, \pi) \\ r \leftarrow r \circ r' \\ \pi \leftarrow \text{GETOPTIMALPLAN}(\Pi) \\ \text{if GETOPTIMALPLAN}(\Pi) \text{ reports UNSOLVABLE} \\ \quad \text{then return } P \\ P \leftarrow P \cup \{r(\pi)\} \end{cases}$
return $P$

FIG. 9

Definition 2 (plan forbidding reformulation) Let $\Pi$ be a planning task over actions $O$ and $\pi$ be a plan for $\Pi$. A planning task $\Pi'$ over actions $O'$ is a plan forbidding reformulation of $\Pi$ if there exists an action mapping $r : O' \mapsto O$ and its extension $r'$ such that $\pi'$ is a plan for $\Pi'$ iff $r'(\pi')$ is a plan for $\Pi$ with $cost'(\pi') = cost(r'(\pi'))$ and $r'(\pi') \neq \pi$.

FIG. 10

Definition 3 Let $\Pi = \langle \mathcal{V}, O, s_0, s_*, cost \rangle$ be a planning task and $\pi = o_1 \ldots o_n$ be some plan. The task $\Pi_{\overline{\pi}} = \langle \mathcal{V}', O', s_0', s_*', cost' \rangle$ is defined as follows.

- $\mathcal{V}' = \mathcal{V} \cup \{\overline{v}, \overline{v}_0 \ldots \overline{v}_n\}$, with $\overline{v}_i$ being binary variables,
- $O' = \{o^e \mid o \in O, o \notin \pi\} \cup \{o^1, o^2 \mid o \in \pi\} \cup \bigcup_{i=1}^{n} \{o_i^3\}$, where $o^e = \langle pre(o), eff(o) \cup \{\langle \overline{v}, 0 \rangle\} \rangle$, $o^1 = \langle pre(o) \cup \{\langle \overline{v}, 0 \rangle\}, eff(o) \rangle$, $o^2 = \langle pre(o) \cup \{\langle \overline{v}, 1 \rangle\} \bigcup_{o=o_i, 1 \leq i \leq n} \{\langle \overline{v}_{i-1}, 0 \rangle\}, eff(o) \cup \{\langle \overline{v}, 0 \rangle\} \rangle$, $o_i^3 = \langle pre(o_i) \cup \{\langle \overline{v}, 1 \rangle, \langle \overline{v}_{i-1}, 1 \rangle\},$
$\qquad eff(o_i) \cup \{\langle \overline{v}_{i-1}, 0 \rangle, \langle \overline{v}_i, 1 \rangle\} \rangle$, and $cost'(o^e) = cost'(o^1) = cost'(o^2) = cost'(o^3) = cost(o)$,

- $s_0'[v] = s_0[v]$ for all $v \in \mathcal{V}$, $s_0'[\overline{v}] = 1$, $s_0'[\overline{v}_0] = 1$, and $s_0'[\overline{v}_i] = 0$ for all $1 \leq i \leq n$, and
- $s_*'[v] = s_*[v]$ for all $v \in \mathcal{V}$ s.t. $s_*[v]$ defined, and $s_*'[\overline{v}] = 0$.

FIG. 11

Definition 4 (structural symmetry) For a $SAS^+$ planning task $\Pi = \langle V, O, s_0, s_*, cost \rangle$, let $F$ be the set of $\Pi$'s facts, i.e., pairs $\langle v, d \rangle$ with $v \in V, d \in dom(v)$. A structural symmetry for $\Pi$ is a permutation $\sigma$ : $V \cup F \cup O \to V \cup F \cup O$, where:
1. $\sigma(V) = V$ and $\sigma(F) = F$ such that $\sigma(\langle v, d \rangle) = \langle v', d' \rangle$ implies $v' = \sigma(v)$;
2. $\sigma(O) = O$ such that for $o \in O$, $\sigma(pre(o)) = pre(\sigma(o))$, $\sigma(eff(o)) = eff(\sigma(o))$, $cost(\sigma(o)) = cost(o)$;
3. $\sigma(s_*) = s_*$;

where $\sigma(\{x_1,...,x_n\}) := \{\sigma(x_1),...,\sigma(x_n)\}$, and for a partial state $s$, $s' := \sigma(s)$ is the partial state obtained from $s$ s.t. for all $v \in V(s)$, $\sigma(\langle v, s[v] \rangle) = \langle v', d' \rangle$ implies $s'[v'] = d'$.

FIG. 12

Definition 5 ($G(P)$-forbidding reformulation) Let $\Pi$ be a planning task over actions $O$ and $P$ be some set of plans for $\Pi$. A task $\Pi'$ over actions $O'$ is a $G(P)$-forbidding reformulation of $\Pi$ if there exists a mapping of actions $r: O' \mapsto O$, and its extension $r'$ such that $\pi'$ is a plan for $\Pi'$ iff $r'(\pi')$ is a plan for $\Pi$ with $cost'(\pi') = cost(r'(\pi'))$ and $r'(\pi') \notin G(P)$.

FIG. 13

Definition 6 Let $\Pi = \langle V, O, s_0, s_*, cost \rangle$ be a planning task, $P$ be some set of plans, and $G := G(P) = (N, E)$. The task $\Pi_{\bar{G}} = \langle V', O', s'_0, s'_*, cost' \rangle$ is defined as follows.

- $V' = V \cup \{\bar{v}\} \cup \{\bar{v}_s \mid s \in N\}$, with $\bar{v}_s$ being binary variables,

- $O' = \{o^e \mid o \in O \setminus O(G)\} \cup \bigcup_{o \in O(G)} \{o^1, o^2\} \cup \bigcup_{(s,t) \in E} \{o^3_{(s,t)}\}$, where $o^e = \langle pre(o), eff(o) \cup \{\langle \bar{v}, 0 \rangle\} \rangle$ $o^1 = \langle pre(o) \cup \{\langle \bar{v}, 0 \rangle\}, eff(o) \rangle$ $o^2 = \langle pre(o) \cup \{\langle \bar{v}, 1 \rangle\} \cup \{\langle \bar{v}_s, 0 \rangle \mid (s,t) \in E^o\},$
$\quad eff(o) \cup \{\langle \bar{v}, 0 \rangle\} \rangle$ $o^3_{(s,t)} = \langle pre(o_{(s,t)}) \cup \{\langle \bar{v}_s, 1 \rangle\}, \langle \bar{v}_s, 1 \rangle\},$
$\quad eff(o_{(s,t)}) \cup \{\langle \bar{v}_s, 0 \rangle, \langle \bar{v}_t, 1 \rangle\} \rangle,$ and $cost'(o^e) = cost'(o^1) = cost'(o^2) = cost'(o^3) = cost(o),$

- $s'_0[v] = s_0[v]$ for all $v \in V$, $s'_0[\bar{v}] = 1$, $s'_0[\bar{v}_{s_0}] = 1$, and $s'_0[\bar{v}_s] = 0$ for all $s \in N \setminus \{s_0\}$, and

- $s'_*[v] = s_*[v]$ for all $v \in V$ s.t. $s_*[v]$ defined, and $s'_*[\bar{v}] = 0$.

FIG. 14

Algorithm : ITERATIVETOPKMULTIPLE($\Pi, k$)

$P \leftarrow \emptyset, T \leftarrow \emptyset, B \leftarrow \emptyset, r \leftarrow id$
while $|T| < k$
do $\begin{cases} \Pi, r' \leftarrow \text{GRAPHFORBIDREFORMULATION}(\Pi, G(P)) \\ r \leftarrow r \circ r' \\ \pi \leftarrow \text{GETOPTIMALPLAN}(\Pi) \\ \text{if GETOPTIMALPLAN}(\Pi) \text{ reports UNSOLVABLE} \\ \quad \text{then return SETTOPELEMENTS}(T \cup B, k) \\ P \leftarrow \text{EXTENDPLAN}(\Pi, \pi) \\ T_P \leftarrow \{r(\pi') \mid \pi' \in G(P), cost(\pi') = cost(\pi)\} \\ B_P \leftarrow \{r(\pi') \mid \pi' \in G(P), cost(\pi') > cost(\pi)\} \\ T \leftarrow T \cup T_P \cup \{\pi' \in B \mid cost(\pi') = cost(\pi)\} \\ B \leftarrow B \setminus T \cup B_P \end{cases}$
return SETTOPELEMENTS($T, k$)

*FIG. 15*

| COVERAGE | k-10 | | k-100 | | k-1000 | | k-10000 | | | |
|---|---|---|---|---|---|---|---|---|---|---|
| | IndepS | NaiveS | IndepS | NaiveS | IndepS | NaiveS | IndepS | NaiveS | $K^*_{bl}$ | $K^*_{iPDB}$ |
| airport | 28(2) | 28(1) | 22(18) | 26(1) | 14(1) | 26(1) | 11(1) | 26(1) | 16 | 11 |
| barman11 | 8(1) | 8(1) | 8(1) | 8(1) | 1(1) | 8(1) | 0(0) | 0(0) | 4 | 4 |
| barman14 | 3(1) | 3(1) | 3(1) | 3(1) | 3(1) | 3(1) | 0(0) | 3(1) | 0 | 0 |
| blocks | 22(9) | 27(5) | 13(99) | 16(78) | 0(0) | 0(0) | 0(0) | 0(0) | 18 | 18 |
| childsnack14 | 6(1) | 6(1) | 6(1) | 6(1) | 6(1) | 6(1) | 6(1) | 6(1) | 0 | 0 |
| depot | 9(1) | 9(1) | 6(20) | 9(9) | 3(1) | 8(34) | 2(1) | 7(1) | 3 | 3 |
| driverlog | 13(1) | 13(1) | 13(15) | 13(6) | 2(1) | 11(2) | 0(0) | 7(1) | 4 | 4 |
| elevators08 | 22(2) | 22(1) | 8(18) | 19(6) | 3(2) | 18(1) | 0(0) | 14(1) | 4 | 4 |
| elevators11 | 18(2) | 18(1) | 6(7) | 15(1) | 3(2) | 15(1) | 0(0) | 12(1) | 2 | 2 |
| floortile11 | 8(1) | 8(1) | 8(1) | 8(1) | 4(1) | 8(1) | 0(0) | 8(1) | 0 | 0 |
| floortile14 | 8(1) | 8(1) | 8(1) | 8(1) | 6(1) | 8(1) | 0(0) | 8(1) | 0 | 0 |
| freecell | 13(2) | 14(1) | 6(75) | 11(36) | 0(0) | 2(1) | 0(0) | 0(0) | 13 | 13 |
| ged14 | 13(8) | 13(8) | 5(96) | 5(94) | 0(0) | 0(0) | 0(0) | 0(0) | 10 | 10 |
| grid | 1(9) | 1(9) | 1(99) | 1(99) | 0(0) | 0(0) | 0(0) | 0(0) | 0 | 0 |
| gripper | 20(1) | 20(1) | 20(1) | 20(1) | 20(1) | 20(1) | 20(2) | 20(1) | 6 | 6 |
| hiking14 | 13(1) | 13(1) | 13(1) | 13(1) | 13(8) | 13(1) | 6(1) | 11(1) | 6 | 6 |
| logistics00 | 20(1) | 20(1) | 20(5) | 20(1) | 17(1) | 20(11) | 16(1) | 17(1) | 10 | 10 |
| logistics98 | 6(1) | 6(1) | 6(13) | 6(1) | 2(1) | 6(1) | 2(1) | 5(1) | 1 | 1 |
| miconic | 142(1) | 142(1) | 142(13) | 141(13) | 102(6) | 79(5) | 78(2) | 37(4) | 40 | 40 |
| movie | 30(1) | 30(1) | 30(1) | 30(1) | 30(4) | 30(1) | 30(76) | 30(6) | 30 | 30 |
| mprime | 22(7) | 22(6) | 13(88) | 13(81) | 0(0) | 0(0) | 0(0) | 0(0) | 1 | 1 |
| mystery | 19(6) | 19(6) | 15(61) | 15(58) | 4(1) | 4(1) | 4(1) | 4(1) | 5 | 8 |
| nomystery11 | 15(1) | 15(1) | 15(14) | 15(12) | 3(26) | 5(6) | 1(1) | 1(1) | 7 | 9 |
| openstacks08 | 24(1) | 24(1) | 24(2) | 24(1) | 23(2) | 23(1) | 18(1) | 22(1) | 14 | 17 |
| openstacks11 | 19(1) | 19(1) | 19(1) | 19(1) | 19(1) | 19(1) | 16(1) | 19(1) | 9 | 12 |
| openstacks14 | 5(1) | 5(1) | 5(1) | 5(1) | 4(1) | 5(1) | 4(1) | 5(1) | 1 | 1 |
| openstacks | 5(1) | 7(1) | 5(1) | 6(1) | 1(10) | 5(1) | 0(0) | 5(1) | 7 | 7 |
| parcprinter08 | 18(2) | 18(1) | 17(30) | 18(6) | 5(2) | 17(1) | 4(2) | 16(2) | 7 | 13 |
| parcprinter11 | 13(2) | 13(1) | 12(30) | 13(1) | 3(1) | 13(1) | 2(1) | 12(2) | 3 | 9 |
| parking11 | 1(9) | 1(9) | 0(0) | 0(0) | 0(0) | 0(0) | 0(0) | 0(0) | 0 | 0 |
| parking14 | 0(0) | 0(0) | 0(0) | 0(0) | 0(0) | 0(0) | 0(0) | 0(0) | 0 | 0 |
| pathways-nn | 5(1) | 5(1) | 5(14) | 5(2) | 4(42) | 5(28) | 2(1) | 3(1) | 3 | 3 |
| pegsol08 | 28(7) | 28(4) | 15(66) | 20(47) | 5(73) | 7(51) | 5(73) | 5(72) | 26 | 26 |
| pegsol11 | 18(6) | 18(3) | 5(44) | 9(17) | 0(0) | 3(1) | 0(0) | 0(0) | 16 | 16 |
| pipes-notank | 20(2) | 21(1) | 17(18) | 19(8) | 1(87) | 12(16) | 0(0) | 6(1) | 6 | 6 |
| pipes-tank | 16(2) | 16(1) | 14(16) | 15(15) | 11(10) | 12(8) | 5(6) | 8(6) | 6 | 6 |
| psr-small | 49(3) | 49(2) | 43(42) | 49(28) | 7(4) | 21(2) | 1(1) | 11(1) | 43 | 43 |

| | | | | | | | | | |
|---|---|---|---|---|---|---|---|---|---|
| rovers | 7(1) | 7(1) | 6(30) | 7(3) | 0(0) | 5(84) | 0(0) | 3(1) | 4 | 4 |
| satellite | 13(1) | 13(1) | 11(18) | 13(12) | 4(1) | 8(1) | 3(1) | 8(1) | 4 | 4 |
| scanalyzer08 | 16(2) | 16(1) | 16(21) | 16(16) | 9(1) | 13(5) | 7(1) | 8(1) | 6 | 6 |
| scanalyzer11 | 13(1) | 13(1) | 13(11) | 13(7) | 8(1) | 12(5) | 7(1) | 8(1) | 3 | 3 |
| sokoban08 | 14(6) | 29(2) | 6(75) | 23(20) | 0(0) | 11(1) | 0(0) | 10(1) | 15 | 21 |
| sokoban11 | 9(6) | 19(2) | 3(52) | 14(11) | 0(0) | 6(1) | 0(0) | 5(1) | 12 | 17 |
| storage | 17(2) | 17(2) | 17(23) | 17(20) | 3(19) | 7(16) | 0(0) | 5(2) | 11 | 11 |
| tetris14 | 8(1) | 8(1) | 5(22) | 8(6) | 0(0) | 7(1) | 0(0) | 6(1) | 5 | 1 |
| tidybot11 | 11(1) | 14(1) | 3(68) | 14(5) | 0(0) | 10(1) | 0(0) | 0(0) | 1 | 1 |
| tidybot14 | 4(1) | 9(1) | 0(0) | 9(1) | 0(0) | 6(1) | 0(0) | 1(1) | 0 | 0 |
| tpp | 7(2) | 7(2) | 7(19) | 7(18) | 5(7) | 5(8) | 4(1) | 4(1) | 5 | 5 |
| transport08 | 9(5) | 9(4) | 5(58) | 7(32) | 0(0) | 3(7) | 0(0) | 1(1) | 8 | 8 |
| transport11 | 4(6) | 5(4) | 0(0) | 3(1) | 0(0) | 3(1) | 0(0) | 1(1) | 3 | 3 |
| transport14 | 2(5) | 4(3) | 1(22) | 2(1) | 0(0) | 2(1) | 0(0) | 1(1) | 3 | 3 |
| trucks | 12(1) | 12(1) | 12(14) | 12(10) | 5(1) | 8(1) | 1(1) | 5(1) | 4 | 4 |
| visitall11 | 9(6) | 9(6) | 9(68) | 9(68) | 1(124) | 1(124) | 0(0) | 0(0) | 8 | 8 |
| visitall14 | 4(7) | 4(7) | 1(13) | 1(13) | 0(0) | 0(0) | 0(0) | 0(0) | 2 | 2 |
| woodwork08 | 18(1) | 18(1) | 18(15) | 18(3) | 8(10) | 16(1) | 4(1) | 13(1) | 4 | 6 |
| woodwork11 | 12(1) | 12(1) | 12(4) | 12(1) | 7(11) | 12(1) | 3(1) | 12(1) | 0 | 1 |
| zenotravel | 13(3) | 13(3) | 12(43) | 13(39) | 4(57) | 7(33) | 1(1) | 4(1) | 5 | 5 |
| SUM | 882 | 927 | 725 | 841 | 373 | 574 | 263 | 423 | 424 | 452 |

ITERATIVE GENERATION OF TOP QUALITY PLANS IN AUTOMATED PLAN GENERATION FOR ARTIFICIAL INTELLIGENCE APPLICATIONS AND THE LIKE

TECHNICAL FIELD

The present invention relates to the electrical, electronic, and computer arts, and more specifically, to artificial intelligence and related technologies.

BACKGROUND

Automated planning is a long-standing sub-area of Artificial Intelligence (AI) that aims at solving problems that involve finding a strategy of action, provided that the problems are modeled in a suitable input language. Optimal planning seeks to find the one best solution to a problem. A variety of optimal planners exist, which are able to solve rather large problems. The problems are PSPACE-hard in general, and no one tool can work well on all planning problems. As the skilled artisan will appreciate, in computational complexity theory, PSPACE is the set of all decision problems that can be solved by a Turing machine using a polynomial amount of space.

Top K planning seeks to find the K best solutions, and is used within several tools, such as the research prototype Scenario Planning Advisor (SPA).

Current techniques are restricted to searching in the problem's state space using a K* search algorithm and an admissible and consistent heuristic; this does not work well on many problems, and a long time is typically required till the first solution.

SUMMARY

Embodiments of the present disclosure provide techniques for iterative generation of top quality plans in automated plan generation. According to an embodiment of the present invention, an exemplary method for improving performance of at least one hardware processor solving a top-k planning problem includes obtaining, in a memory coupled to the at least one processor, a specification of the planning problem in a planning language; obtaining, in a first iteration carried out by the at least one processor, at least one solution to the planning problem; modifying, in the first iteration carried out by the at least one processor, the planning problem to forbid the at least one solution; and repeating, by the at least one processor, the obtaining of the at least one solution and the modifying to forbid the at least one solution, for a plurality of additional iterations, after the first iteration, until a desired number, k, of solutions to the planning problem are found or until no further solutions exist, whichever comes first According to another embodiment of the present invention, an exemplary computer system for controlling an industrial robot by solving a top-k planning problem includes a memory; an interface to the industrial robot; and at least one processor, coupled to the memory and the interface, and operative to: obtain a specification of the planning problem in a planning language; obtain, in a first iteration, at least one solution to the planning problem; modify, in the first iteration, the planning problem to forbid the at least one solution; repeat the obtaining of the at least one solution and the modifying to forbid the at least one solution, for a plurality of additional iterations, after the first iteration, until a desired number, k, of solutions to the planning problem are found or until no further solutions exist, whichever comes first; and provide a signal to the interface to cause the industrial robot to operate in accordance with the k solutions to the planning problem.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

provides an "anytime" approach, obtaining solutions incrementally;

provides shorter time to first solution than current techniques; and/or can be implemented using existing optimal planners.

These and other features and advantages of the present invention will become apparent from the following detailed description of illustrative embodiments thereof, which is to be read in connection with the accompanying drawings.

BRIEF DESCRIPTION OF THE DRAWINGS

FIG. 7 presents a first definition (top-k planning problem), according to an aspect of the invention;

FIG. 8 presents an exemplary algorithm (ITERATIVETOPK ((Π, k)), according to an aspect of the invention;

FIG. 9 presents a second definition (plan forbidding reformulation), according to an aspect of the invention;

FIG. 10 presents a third definition (task), according to an aspect of the invention;

FIG. 11 presents a fourth definition (structural symmetry), according to an aspect of the invention;

FIG. 12 presents a fifth definition (G(P)-forbidding reformulation), according to an aspect of the invention;

FIG. 13 presents a sixth definition (task), according to an aspect of the invention;

FIG. 14 presents an exemplary algorithm (ITERATIVETOPK-MULTIPLE(Π, k)), according to an aspect of the invention;

DETAILED DESCRIPTION

As noted, automated planning is a long-standing sub-area of Artificial Intelligence (AI) that aims at solving problems that involve finding a strategy of action, provided that the problems are modeled in a suitable input language. Optimal planning seeks to find the one best solution to a problem. A variety of optimal planners exist, which are able to solve rather large problems. The problems are PSPACE-hard in general, and no one tool can work well on all planning problems. As the skilled artisan will appreciate, in computational complexity theory, PSPACE is the set of all decision problems that can be solved by a Turing machine using a polynomial amount of space.

Top K planning seeks to find the K best solutions, and is used within several tools, such as the research prototype Scenario Planning Advisor (SPA).

Current techniques are restricted to searching in the problem's state space using a K* search algorithm and an admissible and consistent heuristic; this does not work well on many problems, and a long time is typically required till the first solution.

Figure 1:
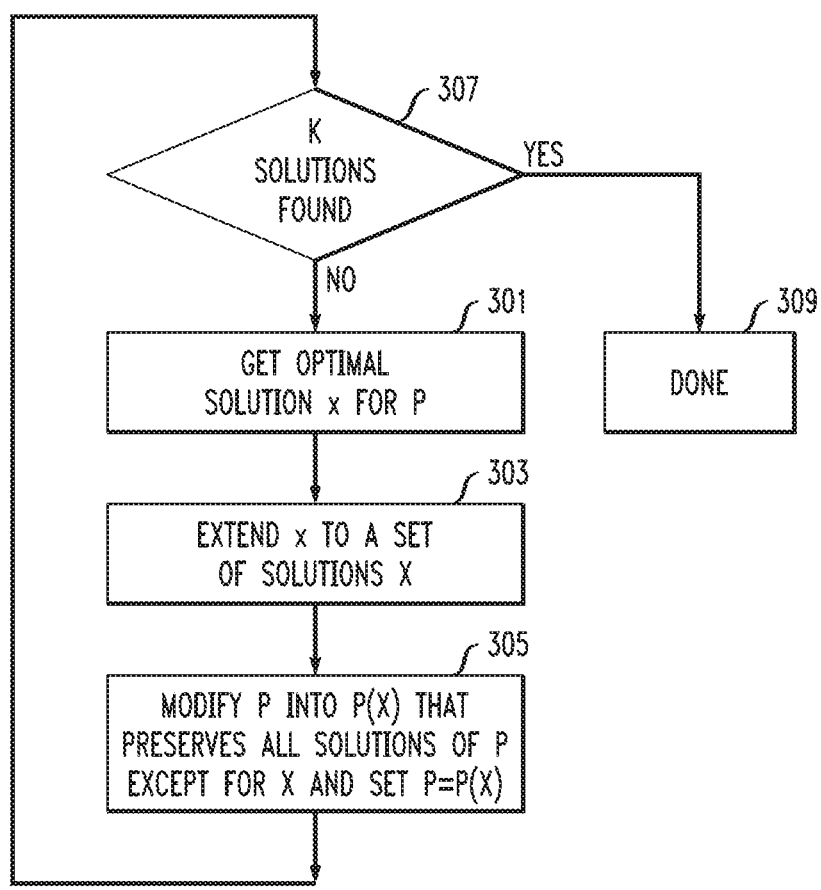
FIG. 1 is a flow chart of an exemplary method, according to an aspect of the invention.

FIG. 1 is a flow chart of an exemplary solution method, according to an aspect of the invention. One or more embodiments solve the top K planning problem iteratively, by exploiting existing optimal solvers, overcoming prior art problems associated with the forbidding of already-found solutions by using techniques disclosed herein. In step 301, obtain one optimal solution to the planning problem. In step 303, extend the obtained solution to a set of solutions using several suggested techniques. Non-limiting exemplary novel methods are described below (technique M1). In step 305, modify the problem to forbid the set of solutions found in step 303. Non-limiting exemplary novel methods are described below (technique M2). As indicated by decision block 307, repeat from step 301 until the requested number of solutions is found. That is to say, if the desired K solutions have been found, as per the "YES" branch of block 307, the routine finishes at 309; whereas if the desired K solutions have not been found, as per the "NO" branch of block 307, logical flow returns to step 301.

Figure 2:
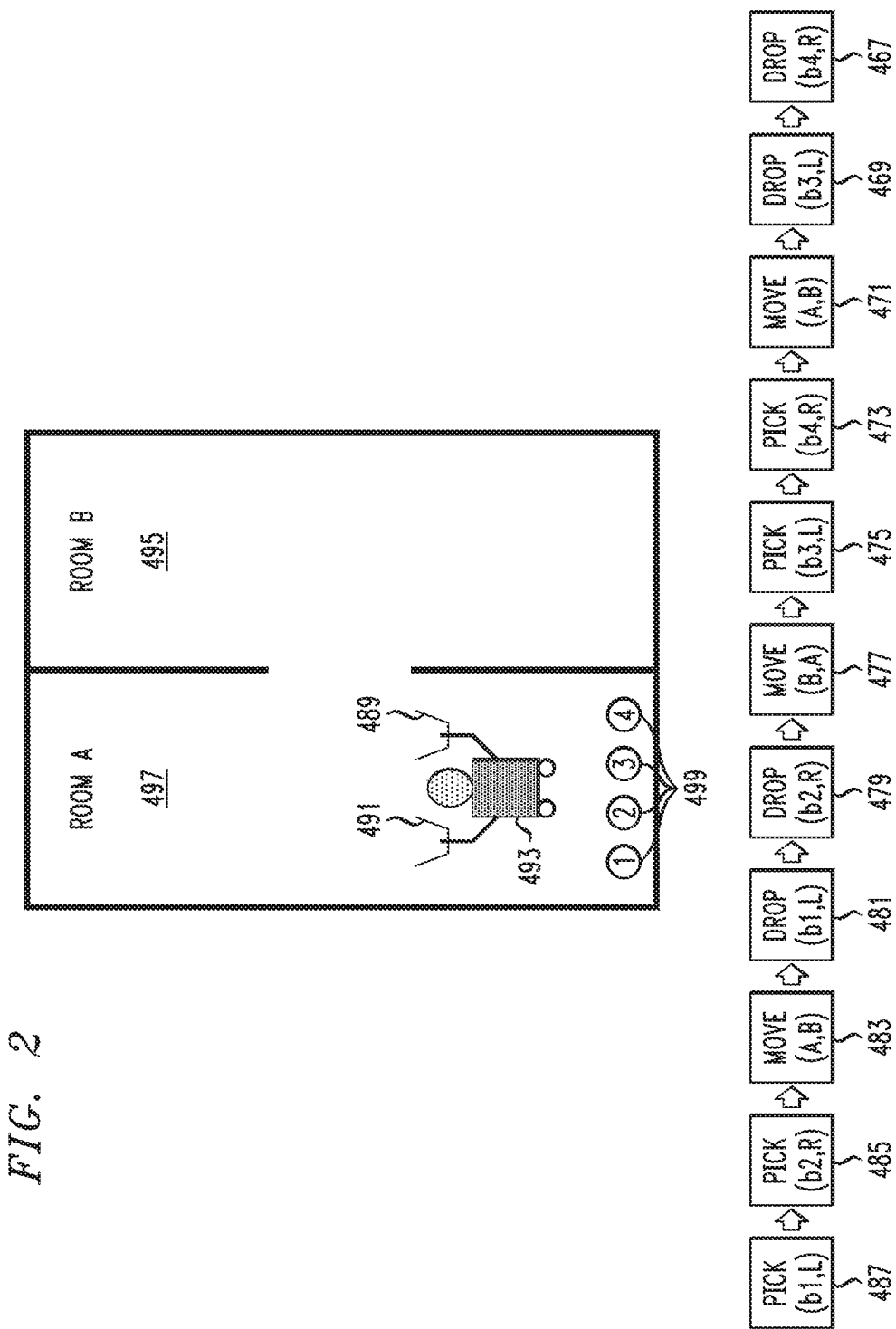
FIG. 2 depicts an exemplary optimal plan for moving balls from one room to another with a gripper, according to an aspect of the invention.

Refer now to FIG. 2. Suppose that initially, there are four balls 499 in room A 497, which need to be moved to room B 495. A robot 493 with two grippers, L 491 and R 489, is initially located in room A 497 and can be used to pick a ball with each gripper and drop it from the gripper, as well as moving between rooms. An exemplary optimal plan is shown at the bottom of FIG. 2. In step 487, pick up the first ball with the left gripper. In step 485, pick up the second ball with the right gripper. In step 483, move from room A to room B. In step 481, drop the first ball from the left gripper. In step 479, drop the second ball from the right gripper. In step 477, move from room B to room A. In step 475, pick up the third ball with the left gripper. In step 473, pick up the fourth ball with the right gripper. In step 471, move from room A to room B. In step 469, drop the third ball from the left gripper. In step 467, drop the fourth ball from the right gripper.

Figure 4:
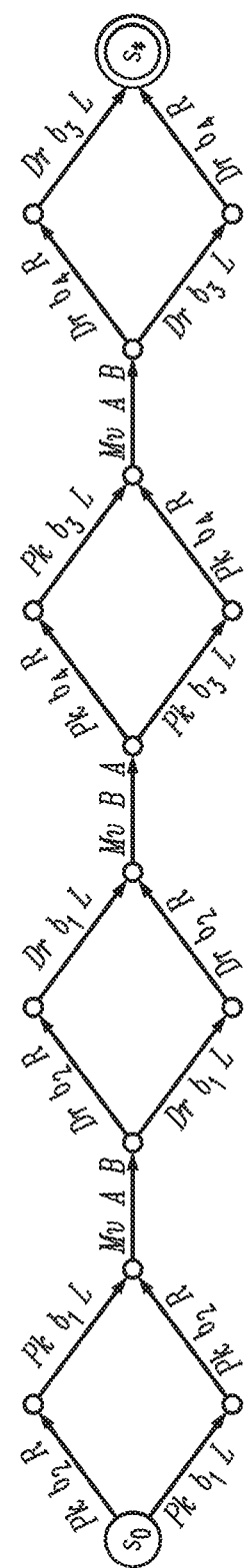
FIG. 4 depicts an order reduction of the example plan for the gripper task of FIG. 2 with four balls, according to an aspect of the invention.

Referring now to FIG. 4, consider a first approach M1.1 to technique M1: Extend a plan to a set of plans by, for example, using reordering of actions in a plan. One suggested novel approach makes use of the notion of independence between operators. Refer to Wehrle, M. and Helmert, M., "About partial order reduction in planning and computer aided verification," in ICAPS 2012, p. 297-305 (2012), hereby expressly incorporated herein by reference in its entirety for all purposes. The procedure follows the order of the operators in the plan, gathering (pairwise) independent operators into the set as long as possible. A new set is started every time a non-independent operator is met. In what follows, this procedure is referred to as "Indep." The complexity of this procedure is exponential in the size of the largest independent set of operators. FIG. 4 is thus an order reduction of the example plan for the gripper task with four balls.

Figure 5:
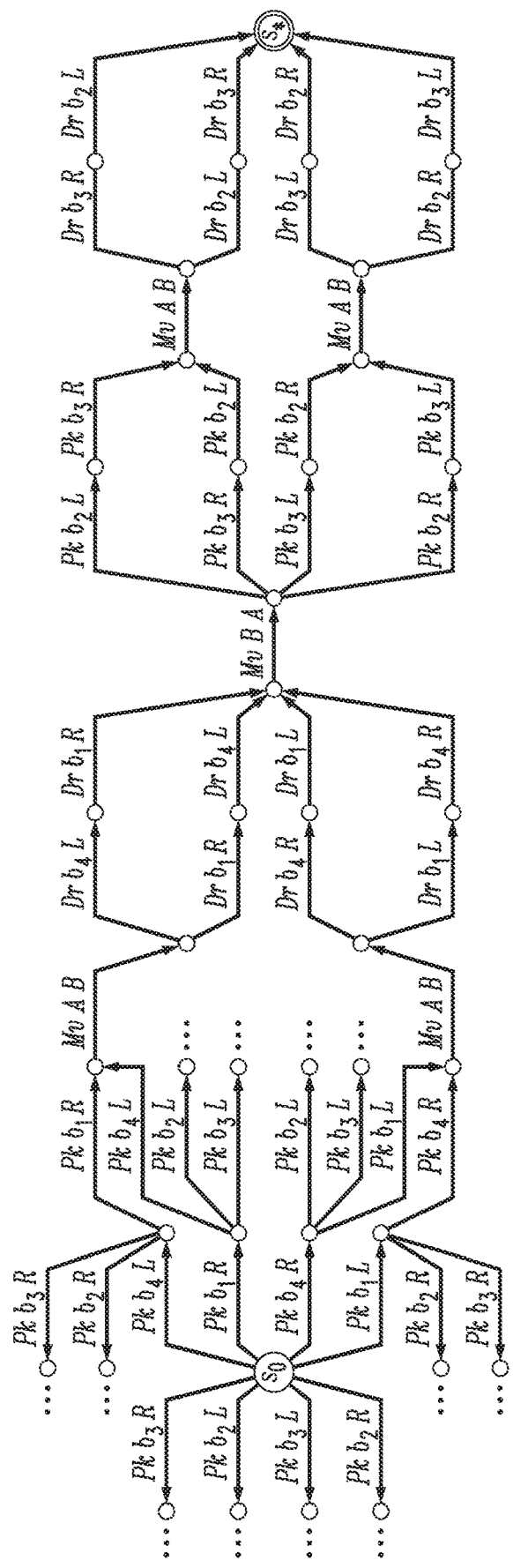
FIG. 5 depicts an extension with symmetries of the example plan for the gripper task with four balls (a fragment), according to an aspect of the invention.

Giving attention now to FIG. 5, consider a second approach M1.2 to technique M1: using structural symmetries of the planning task. Refer to Shleyfman et al., "Heuristics and Symmetries in Classical Planning," Proceedings of the Twenty-Ninth AAAI Conference on Artificial Intelligence, AAAI, 2015, hereby expressly incorporated herein by reference in its entirety for all purposes. One suggested novel approach is to extend a set of plans with symmetries that stabilize the problem's initial state by adding plans symmetric to already existing ones. By "symmetric" is meant the plans that result from mapping the existing plans with structural symmetries. Refer to Definition 4 of FIG. 11, and note that FIG. 5 depicts an extension with symmetries of the example plan for the gripper task with four balls (a fragment).

The aforementioned technique M2 addresses planning problem reformulation to forbid a set of solutions. Provided herein is a novel method M2.1 that receives a planning problem and a set of plans (solutions to the planning problem) and returns a planning problem that preserves exactly all solutions of the input planning problem, except for the input solutions. See Definition 6 of FIG. 13.

Figure 6:
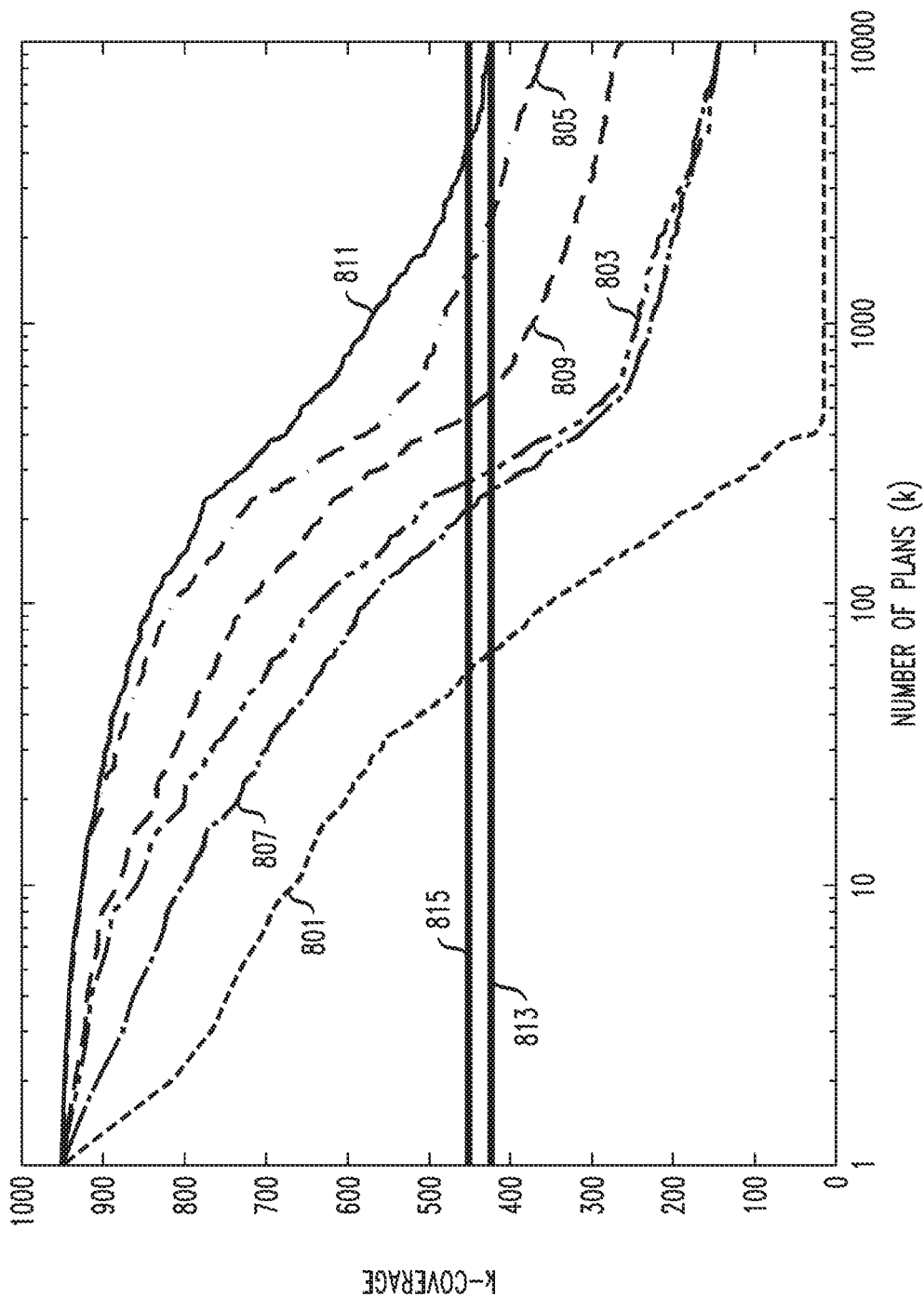
FIG. 6 depicts the k-coverage as a function of the restriction on the number of required plans, for $k \leq 10000$, according to an aspect of the invention.

FIG. 6 shows exemplary benefits over existing methods. One or more embodiments provide an anytime approach, obtaining solutions incrementally; provide shorter time to first solution; and/or exploit existing optimal planners. In FIG. 6, k-coverage is plotted on the vertical axis while the number of plans (k) is plotted in a log scale on the horizontal axis.

The curves are as follows:

TABLE 1

| Configuration | Reference Character |
|---|---|
| None | 801 |
| Indep | 803 |
| Naive | 805 |
| NoneS | 807 |
| IndepS | 809 |
| NaiveS | 811 |
| K*-blind | 813 |
| K*-iPDB | 815 |

One or more embodiments provide a system and/or method for anytime solution of the top K planning problem, including receiving a description of a model in one of the planning languages, such as, for example, PDDL, STRIPS, SAS+, ADL, or the like; receiving a numeric value k identifying the number of plans to be obtained; and producing a set of at most k plans iteratively. The producing step can include, for example, (a) finding one single optimal plan for the input model; (b) extending the found plan p to a set of plans P of an equivalent quality; (c) modifying the input model to a new model with solution set equal to the input model solution set minus P; and (d) repeating the previous three sub-steps (a)-(c) with the new model as an input model until k solutions are found or no other solution exists.

Regarding sub-step (a), in some cases, at each step, an optimal solution can be obtained using any optimal planner. Non-limiting examples of suitable optimal planners include Metis; BJOLP; Fast Downward (a configurable planning system, implementing many components, and, depending on the input configuration, can serve as many planners); appropriate ones of those listed in the booklet summarizing the participants on the Deterministic Track of the International Planning Competition (IPC) 2014 (the complete disclosure of which is hereby expressly incorporated by reference herein in its entirety for all purposes); and the like. In particular, optimal planners in the aforementioned booklet are mentioned under "Sequential Optimal Track" and include AllPACA, cGamer, DPMPlan, Dynamic-Gamer, Gamer, Fast Downward Cedalion, hflow, hpp, hppce, Metis, MIPlan, NuCeLaR, RIDA, Rational Lazy A*, SPM&S, SymBA*-1, and SymBA*-2.

Also regarding sub-step (a), in some cases, different planners can be used at different iterations.

Regarding sub-step (b), in some cases, the set of plans P includes only those found in sub-step (a) plan p.

Also regarding sub-step (b), in some cases, the plan found in step (a), plan p, can be extended to a set P using reordering of the operators in p.

Further regarding sub-step (b), in some cases, the set P can further be extended to a larger set of plans using symmetries of the input model, by adding symmetrical plans.

Regarding sub-step (c), in some cases, the input model can be modified to preserve exactly all solutions of the input model, except for the input set of plans.

Thus, consider that while cost-optimal planning aims at finding one best quality plan, top-k planning deals with finding a set of solutions, such that no better quality solution exists outside that set. One or more embodiments provide a novel iterative approach to top-k planning, capable of employing any cost-optimal planner and reformulating a planning task to forbid exactly the given set of solutions. In addition, to compare to existing approaches to finding top-k solutions, one or more embodiments implement the K* algorithm in an existing PDDL planner, creating the first K* based solver for PDDL planning tasks. As demonstrated herein, the iterative approach performs better for up to a large required size solution sets (thousands), while the K* based approach excels on extremely large ones.

Cost-optimal planning is the problem of finding one goal-achieving sequence of actions or a plan of a minimal summed up cost in any units (including but not limited to monetary cost; e.g., also including distances between locations or probabilities of how good a particular object can be perceived or grasped, time (e.g., execution time), loss of efficiency, etc.). Such plans are of interest in many applications, where the quality of solution is of extreme importance; in particular, in problems where preferences or likelihoods are encoded as cost of the actions. In many cases, one best solution is not sufficient, and the desire is to obtain a set of solutions of a high quality. Top-k planning is one way of obtaining such a set. It is the problem of finding a set of solutions of size k, such that no better solution exists outside the set. While finding a set of plans is motivated by several applications including plan repair, often within the context of diverse planning, other applications including risk management, hypothesis and explanation generation require to focus on high-quality plans instead, as the underlying approach of plan-recognition-as-planning works best with such plans.

Recently, the use of a k-shortest path algorithm called K* has been proposed to address the top-k planning problem. Experimental results have shown that the planning time to compute top-k plans is comparable to finding the optimal plan; in addition, the quality of the solutions found is much higher compared to the use of the diverse version of the LPG planner which computes a set of diverse plans. Note that the focus of diverse planning is not on plan quality, and accordingly, top-k planning the more suitable approach to the applications above.

One major limitation of K* is the consistency requirement for the heuristic function. This poses a restriction on the usability of the approach, disallowing the use of one of the most successful heuristics to date (discussed further below). Further, all plans are found almost simultaneously, requiring a long time until the first solution is found. Moreover, the existing implementation of K* for planning is in a planner that supports Stream Processing Planning Language (SPPL), and not in PDDL. Thus, there are no experimental results for K* on the standard planning benchmarks. To alleviate these problems, an iterative approach to top-k planning has been suggested: given a solution to a planning task, encode a set of new planning tasks which, cumulatively, preserve all solutions of the original task, except for the given one. Then, a search is performed on a tree of reformulations, invoking an existing planner in each node. As the number of successors of each node is the number of actions in the found plan, the clear down side of such an approach is the large number of invocations of the underlying planner. On the positive side, the approach exhibits an anytime behavior, with the first plan found rather quickly.

One or more embodiments advantageously provide an alternative iterative approach to top-k planning, finding additional solutions by reformulating the planning task at hand into a single task, preserving all solutions except for the given one. To this end, such reformulations are formally defined and one such instance is presented. Additional ways of deriving solutions from the previously found ones are suggested, further reducing the number of invocations of the underlying cost-optimal planner. The reformulation is extended to forbid multiple plans at once, alleviating the increase in task formulation size. Additionally, the K* algorithm is implemented on top of the Fast Downward planning system, allowing performance of the experimental evaluation on International Planning Competition (IPC) benchmarks, comparing the disclosed new iterative approach to K*. Results disclosed herein show that K* works better for extremely large values of k, while the iterative approach excels otherwise.

Consider classical planning tasks as captured by the well-known SAS+ formalism, extended with action costs. In such a planning task $\Pi = \langle O, s_0, s^*, cost \rangle$, V is a finite set of finite-domain state variables. Each variable $v \in V$ is associated with a finite domain D(v) of variable values. A partial assignment p maps a subset of variables $vars(p) \subseteq V$ to values in their domains. For a variable $v \in V$ and partial assignment p, the value of v in p is denoted by p[v] if $v \in vars(p)$ and it is said that p[v] is undefined if $v \notin vars(p)$. A partial assignment s with vars(s)=V, is called a state. State s is consistent with partial assignment p if they agree on all variables in vars(p), shortly denoted by $p \subseteq s$. The product $S = \Pi_{v \in D}(v)$ is called the state space of planning task $\Pi$. The state $s_0$ is called initial state of $\Pi$ and the partial assignment $s^*$ is called the goal of $\Pi$. A state s is called a goal state if $s^* \subseteq s$ and the set of all goal states is denoted by $S_s^*$. The finite set O is a set of actions, each action is a pair $\langle pre, eff \rangle$ where pre is a partial assignment called precondition and eff is a partial assignment called effect. Further each action o has an associated natural number cost(o), called cost. An action $o = \langle pre, eff \rangle$ is applicable in state s if $pre \subseteq s$. Applying action o in state s results in a state denoted by s[[o]] where s[[o]][v]=eff[v] for all $v \in vars(eff)$ and =s[[o]][v]=s[v] for all other variables. An action sequence $\pi = \langle o_1, \ldots, o_n \rangle$ is applicable in state s if there are states $s_0, \ldots, s_n$, such that $o_i$ is applicable in $s_{i-1}$ and $s_{i-1}[[o_i]]=s$; for $0 \leq i \leq n$. The variable $s_n$ is denoted by s[[$\pi$]]. For convenience, $o_1, \ldots, o_n$ is used instead of $\langle o_1, \ldots, o_n \rangle$. An action sequence with s[[$\pi$]]$\in S_s^*$ is called a plan. The cost of a plan $\pi$, denoted by cost($\pi$) is the summed cost of the actions in the plan. For a planning task $\Pi = \langle V, O, s_0, s^*, cost \rangle$, the set of all plans is denoted by $P_\Pi$. A plan $\pi$ is optimal if its cost is minimal among all plans in $P_\Pi$. Let $\Pi, \Pi'$ be two planning tasks with actions O and O' respectively. A total function $r: O' \to O$ is called an action mapping. The mapping $r': O^{*n} \to O'^n$ for a non-negative integer n, is called the extension of action mapping r if for every action sequence $\pi' = \langle o'_1, \ldots, o'_n \rangle$ with $o_i \in O'$ for $0 \leq i \leq n$ there is an action sequence $\pi = \langle r(o'_1), \ldots, r(o'_n) \rangle$ and $r'(\pi') = \pi$.

The top-k planning problem is defined in Definition 1 of FIG. 7.

The objective of top-k planning is finding the k-plans of lowest costs for a planning task $\Pi$ and thus optimal planning is the special case of top-1 planning.

Repeatedly Forbidding Plans

An exemplary algorithmic scheme for solving a top-k planning problem $\langle \Pi, k \rangle$ is now introduced. One pertinent aspect of this scheme is an iteration of the following steps: (1) Find an optimal plan $\pi$ for planning task $\Pi$. (2) Reformulate $\Pi$ to a planning task with the same set of plans but excluding $\pi$. (3) Repeat (1) with $\Pi = \Pi'$ and $\pi = \pi'$ unless either k solutions have been found or the $\Pi'$ is provably unsolvable. The scheme is summarized in the Algorithm illustrated in FIG. 8.

One pertinent challenge of turning this algorithmic scheme into a concrete algorithm lies in the reformulation—more concretely, in how to forbid exactly one plan while at the same time preserving every other plan. Refer now to Definition 2 of FIG. 9, which states a necessary condition for such a reformulation in one or more embodiments.

Soundness and completeness of an exemplary scheme, given some plan forbidding reformulation, will now be demonstrated. Construction of a specific exemplary reformulation will be presented herein below.

Consider now Theorem 1, ITERATIVETOPK is sound and complete.

By way of proof, let P be the set of plans returned by the algorithm, $\pi_1 \ldots \pi_m$ be the ordering in which the plans were found and let $\Pi_1 \ldots \Pi_m$ be the sequence of task reformulations constructed by the algorithm such that $\pi_i$ is the optimal plan found for $\Pi_i$. Then cost($\pi_1$)$\leq$ cost($\pi_2$)$\leq \ldots \leq$cost($\pi_m$). If there exists a plan $\pi$ for $\Pi$ such that cost($\pi$)<cost($\pi_i$) for some (assume without loss of generality smallest such) i, and $\pi \neq \pi_j$ for j<i, then from Definition 2, there exists a plan $\pi'$ for $\Pi_i$ such that $r(\pi')=\pi$ and cost($\pi'$)=cost($\pi$)<cost($\pi_i$), contradicting the optimality of the plan $\pi_i$ for $\Pi_i$. If m<k, then the planning task $\Pi_{m+1}$ is unsolvable, and therefore no other solution exists for $\Pi_m$ and thus for $\Pi$.

Theorem 1 opens the door to a novel family of algorithms for top-k planning. Yet, what is missing is to provide a concrete plan forbidding reformulation $\Pi_\pi^-$ for planning task $\Pi$ and a plan $\pi \in P_\Pi$. As mentioned earlier the idea here is that planning task $\Pi_\pi^-$ forbids the sequence of actions $\pi$ from being a plan, accepting all other plans of $\Pi$.

Refer now to Definition 3 of FIG. 10. The semantics of the reformulation in Definition 3 will now be explained. The variable $\bar{v}$ starts from the value 1 and switches to 0 when the sequence of actions applied is not a prefix of $\pi$. Once a value 0 is reached indicating a deviation from plan $\pi$, it cannot be switched back to 1. Variables $\bar{v}_0, \ldots, \bar{v}_n$ encode the progress along the plan $\pi$, before deviating from it. The actions $o^1$ and $o^2$ are the copies of actions in $\pi$ for the cases when $\pi$ is already discarded from consideration (variable $\bar{v}$ has switched its value to 0) and for discarding $\pi$ from consideration (switching $\bar{v}$ to 0). In case there are multiple appearances of an action o on a plan, $o^2$ requires all the corresponding variables $\bar{v}_{i-1}$ for each $o_i=o$ to have the value 0. Thus, $o^2$ will be applicable only in states that are different from the states resulting from applying a prefix of $\pi$ up to some o's representative in the initial state. The $o_i^3$ are copies of actions along $\pi$, with a separate copy for each appearance of the same action o. These actions are responsible for following the sequence $\pi$ and are applicable only while the sequence is still followed.

In the following Theorem 2, it will be demonstrated that the planning task in Definitions 3 is indeed a plan-forbidding reformulation. In this regard, let $\Pi$ be a planning task and $\pi$ be its plan. The task $\Pi_\pi^-$ is a plan forbidding reformulation of $\Pi$ and $\pi$.

By way of proof, let $r: O^1 \to O$ be the mapping defined by $r(o^e)=o$ and $r(o^1)=r(o^2)=r(o_i^3)=o$ for all $1 \leq i \leq n$. Note that $\Pi_\pi^-$ restricted to the variables V equals to the task $\Pi$, modulo the three equal instances of the actions in $\pi$. Thus, for each plan $\pi'$ for $\Pi_\pi^-$, $r(\pi)$ is a plan for $\Pi$.

Still continuing the proof, for the second direction, since for each $o \in \pi$ at most one of the actions $o^1$, $o^2$, $o^3$ is applicable in each state s of $\Pi_\pi^-$, given a sequence of actions $\rho$ applicable in the initial state of $\Pi$, it can be mapped to an applicable in the initial state of $\Pi_\pi^-$ sequence of action $\rho'$ such that $r(\rho')=\rho$, by choosing in each state the relevant representative out of $o^e$, $o^1$, $o^2$, and $o^3$. In other words, r restricted to applicable in the initial state sequences of actions is invertible, and it is thus appropriate to denote its inverse mapping described above by $r^{-1}$.

Further continuing with the proof, first, let $\pi'=r^{-1}(\pi)$ be the inverse of the plan $\pi=o_1 \ldots o_n$ for $\Pi$. Then $\pi'=o_1^3 \ldots o_n^3$, since at step i we have $\bar{v}_0=1$ and $\bar{v}_{i-1}=1$. Thus, after applying $\pi'$, the value of the variable $\bar{v}$ remains 1, and thus $\pi'$ is not a plan for $\Pi_\pi^-$.

Yet further continuing with the proof, now, let $\rho$ be a plan for $\Pi$ such that $\rho \neq \pi$. Let o be the first action on $\rho$ that differs from the corresponding action of $\pi$. In other words, there exists a prefix $\rho'=o_1 \ldots o_m$ of $\rho$ such that (i) $\rho'$o is a prefix of $\rho$, (ii) $\rho'$ is a prefix of $\pi$, and (iii) $\rho'$o is not a prefix of $\pi$. Then we have $r^{-1}(\rho')=o_1^3 \ldots o_m^3$, and since $o \neq o_{m+1}$, the next action on $r^{-1}(\rho)$ will not be $o_{m+1}^3$. If $o \in \pi$, then the next action will be $o^2$ (applicability of which is shown next), and otherwise it will be $o^e$, in both cases setting the value of $\bar{v}$ to 0. Thus, all the following actions o' are mapped to either $o'^e$ or $o'^1$, and the preconditions of these actions are restricted to V and $\bar{v}=0$, the sequence of actions $r^{-1}(\rho)$ achieves the goal values on V and thus is a plan.

The proof can be finalized by showing the applicability of $o^2$ in the state $s_m':=s_0'[[o_1^3 \ldots o_m^3]]$ for $o \in \pi$ such that $o \neq O_{m+1}$. Naturally, pre(o) holds in $s_m'$. Further, since $s_0'[\bar{v}]=1$, $s_0'[\bar{v}_0]=1$, and $s_0'[\bar{v}_1]=0$, for all $1 \leq i \leq n$, after applying $o_1^3 \ldots o_m^3$ we have $s_m'[\bar{v}]=1$, $s_m'[\bar{v}_m]=1$, and $s_m'[\bar{v}_i]=0$, for all $0 \leq i \leq n$, $i \neq m$. Since $o \neq o_{m+1}$, for each $1 \leq i \leq n$ such that $o=o_i$, we have $s_m'[\bar{v}_{i-1}]=0$, and thus $o^2$ is applicable in $s_m'$.

Devising Additional Plans

Consider now devising additional plans. The top-k planning approach disclosed above reformulates a planning task of a solvable top-k planning instance exactly k times. While in each iteration, the reformulated planning task grows only linearly in the plan size, for larger k, such an approach is prohibitively expensive for anything but small tasks. Consider now how this problem can be bypassed. Given an optimal plan $\pi$ for $\Pi$, it is often possible to infer additional optimal plans for $\Pi$ from the structure of the planning task $\Pi$. One or more embodiments forbid, in each iteration, a set of plans instead of a single plan, decreasing the number of reformulations needed. Before introducing an algorithm for this approach, focus will be turned to characteristics of a graph G(P) representing such a set of plans.

First, given two plans $\pi_1$ and $\pi_2$, if these plans intersect, i.e., pass through the same state s, then additional plans may be devised out of these two by following one of the plans until the state s and the other plan from the state s onwards. In general, a set of plans P induces a directed graph G(P) over the states of $\Pi$ with edges annotated by the actions on the plans. Each path in G(P) from the initial state to some goal state is a plan for $\Pi$. Formally, G(P)=(N, E), where N={$s \in S | o_1 \ldots o_n \in P$, $s=s_0[[o_1 \ldots o_i]]$, $0 \leq i \leq n$} are all the states encountered by the plans in P and E={(s,t)|s, $t \in S$, $o_1 \ldots o_n \in P$, $s=s_0[[o_1 \ldots o_{i-1}]]$, $t=s[[o_i]]$, $1 \leq i \leq n$} its edges. Each edge (s, t) is labelled with the action $o \in \pi \in P$ inducing it.

G(P) can be viewed as a compact representation for a set of plans P of a planning task $\Pi$. Hence, often more plans are represented by G(P) as compared to P. Proof is now provided regarding the correspondence of paths in G(P) and plans for $\Pi$. Consider Lemma 1. Let $\Pi$ be a planning task and P be a set of plans for $\Pi$. Then, any path in G(P) from $s_0$ to some goal state of $\Pi$ corresponds to a plan for $\Pi$. By way of proof, let $s_0, s_1, \ldots, s_n$ with $s_n \in S_s^*$ be some path in G(P). Each edge $(s_{i-1}, s_i)$ corresponds to some action $o_i$ on a plan in P, and thus $o_i$ is applicable in $s_{i-1}$, giving $o_1 \ldots o_n$ being a plan for $\Pi$.

Consider now Theorem 3. Let $\Pi$ be a planning task and P be a set of optimal plans for $\Pi$. Then, any path in G(P) from $s_0$ to some goal state of $\Pi$ corresponds to an optimal plan for $\Pi$.

By way of proof, let $s_0, s_1, \ldots, s_n$ with $s_n \in S_s^*$ be some path in G(P). From Lemma 1 we have that it corresponds to some plan $o_1 \ldots o_n$ for $\Pi$, where each edge $(s_{i-1}, s_i)$ corresponds to an action $o_i$ on some optimal plan in P. Therefore, $h^*(s_{i-1})=h^*(s_i)+\text{cost}(o_i)$ or $\text{cost}(o_i)=h^*(s_{i-1})-h^*(s_i)$. Summing over the actions in the plan, obtain:

$$\Sigma_{i=1}^n \text{cost}(o_i)=\Sigma_{i=1}^n h^*(s_{i-1})-h^*(s_i)=h^*(s_0).$$

Figure 3:
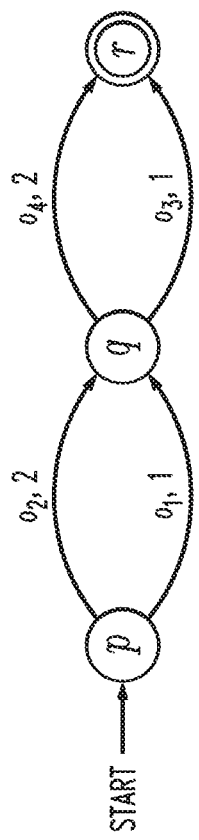
FIG. 3 depicts an example task with one variable and four actions changing its value from the initial value p to q and to the goal value r, with edges labelled with actions, costs, according to an aspect of the invention.

If not all plans in P are optimal, plans may be obtained from G(P) with costs larger than of any plan in P. A simple example for that is described in FIG. 3. FIG. 3 is an example task with one variable and four actions changing its value from the initial value p to q and to the goal value r. Edges are labelled with actions, costs. In FIG. 3, there is one optimal plan $\pi_1=o_1 o_3$ with the cost 2, there are two plans with the cost 3, $\pi_2=o_1 o_4$ and $\pi_3=o_2 o_3$. If P={$\pi_1, \pi_2, \pi_3$}, then there is also a path in G(P) that corresponds to a plan $o_2 o_4$ with the cost 4, which is strictly larger than of any of the plans in P. An algorithm for extracting plans out of G(P) should therefore be able to extract paths of a bounded cost from G(P). One approach is a simple traversal of G(P), starting from the node $s_0$. Given a bound b on the total plan cost, a plan can be incrementally constructed by moving along an edge (x, y) that corresponds to an action o only if for the plan prefix constructed so far $\pi$ that leads from $s_0$ to x holds $\text{cost}(\pi)+\text{cost}(o)+w^*(y) \leq b$, where $w^*(y)$ is the cost of the cheapest path from y to some goal node $t \in S_s^*$. In other words, it is possible to extend $\pi$ with o if there is a possibility to reach the goal under the bound.

Partial Orders on Plans

Regarding Partial Orders on Plans, one simple way to derive additional plans from an existing one is by reordering the actions along the plan. A sequential plan corresponds to a total order over the actions in the plan. It can be reduced to a partial order, which corresponds to multiple total orders, and thus to multiple plans. A minimal partial order can be obtained in polynomial time. Refer, e.g., to Backstrom, C., Computational aspects of reordering plans. *Journal of Artificial Intelligence Research* 9:99-137 (1998), the complete disclosure of which is hereby expressly incorporate herein by reference in its entirety for all purposes. Given the teachings herein, the skilled artisan will be able to implement one or more embodiments by adapting techniques, such as that disclosed in Backstrom, known in themselves to the skilled artisan. The suggested procedure greedily attempts to remove an ordering between two plan actions, while maintaining a valid partial order plan (a partial order plan is valid if all its total order plans are valid). However, it is not clear in which order this ordering should be considered for removal, and thus particular implementations may vary significantly in their performance.

In what follows, a slightly different approach is suggested, exploiting the notion of independence between actions (refer to Wehrle, M. and Helmert, M., "About partial order reduction in planning and computer aided verification," in ICAPS 2012). As used herein, two actions are said to be independent if one action does not invalidate application of another action. For example, suppose an industrial robot has left and right grippers which can operate simultaneously—picking up one ball with the left gripper does not prevent picking up another ball with the right gripper—the two actions are accordingly independent and can be applied in any order. On the other hand, assuming that the gripper only opens wide enough to grasp one ball, picking up one ball with the right gripper prevents picking up another ball at the same time with the right gripper, and thus, those two actions are not independent. The procedure simply follows the order of the actions in the plan, gathering (pairwise) independent actions into the set as long as possible. A new set is started every time a non-independent action is met. In what follows, this procedure is referred to as Indep. The complexity of this procedure is exponential in the size of the largest independent set of actions. FIG. 4 depicts the graph constructed from a plan $\pi_0$=pick($b_1$, L)pick($b_2$, R)move(A, B)drop($b_1$, L)drop($b_2$, R)move(B, A) pick($b_3$, L)pick($b_4$, R)move(A, B)drop($b_3$, L)drop($b_4$, R) for the GRIPPER planning task with four balls, when reducing orders. The graph encodes sixteen different plans obtained by reducing the order between pick($b_1$, L) and pick($b_2$, R), between drop(b1, L) and drop ($b_2$, R), between pic ($b_3$, L) and pick($b_4$, R), and between drop($b_3$, L) and drop($b_4$, R).

Note that some other valid plan reorderings, such as pick($b_3$, L)pick($b_4$, R)move(A, B)drop($b_3$, L)drop($b_4$, R)move(B, A) pick($b_1$, L)pick($b_2$, R)move(A, B)drop($b_1$, L)drop($b_2$, R) are not obtained this way. In order to obtain all possible reorderings of a plan, one can use, e.g., a traversal procedure. In such a case, for a set P of partial order plans, the graph G(P) is induced by possible sequentializations of the plans in P. Note that this can be exponential in the plan length and thus might turn out too expensive in practice. With interest in a bounded number of solutions, which might be significantly smaller than the number of valid reorderings (e.g., in GRIPPER domain), a depth first search traversal without duplicate detection is chosen in a non-limiting example. The algorithm is bound to apply each of the actions on the plan exactly once, and therefore complete. In addition, a cycle detection is performed on each path. The number of times the algorithm has reached the goal is then used in the stopping criteria. In what follows, this procedure is referred to as Naive.

Symmetric Plans

Consider symmetric plans. One limitation of deriving plans based on reducing orders between actions is the restriction to the actions of the original plan. In what follows, it is shown how such a restriction can be alleviated. An additional way of deriving plans from already existing plans is by extending the graph G(P), adding its symmetric counterparts in the state transition graph. This can be done using structural symmetries, which are permutations of facts and actions that induce automorphisms of the state transition graph. Structural symmetries for SAS+ are defined in Definition 4 of FIG. 11. It is said that a structural symmetry a stabilizes a state s if $\sigma(s)$=s. The set of all structural symmetries $\Gamma_\Pi$ of a planning task $\Pi$ forms a group under the composition operation. In what follows, for simplicity, by a symmetry group $\Gamma$ refer to a subgroup of the symmetry group $\Gamma_\Pi$ of the planning task $\Pi$. In practice, a set of structural symmetries of a planning task (that stabilize a given state) can be efficiently computed using off-the-shelf tools for discovery of automorphisms in explicit graphs. Refer to Shleyfman et al., "Heuristics and Symmetries in Classical Planning," Proceedings of the Twenty-Ninth AAAI Conference on Artificial Intelligence, AAAI, 2015.

We extend structural symmetries to sequences of actions in a natural way. Let $\sigma$ be a structural symmetry that stabilizes the initial state $s_0$. Then, for a plan $\pi$ of $\Pi$ we have $\sigma(\pi)$ being a plan of $\Pi$ with cost($\sigma(\pi)$)=cost($\pi$). By $P^\Gamma$ denote the closure of P under $\Gamma$, i.e., $P^\Gamma$={$\sigma(\pi)|\sigma\in\Gamma, \pi\in P$}.

Consider now Theorem 4. Let $\Pi$ be a planning task, $\Gamma$ be a symmetry group of $\Pi$ and P be a set of $\Pi$'s plans. If P is a solution to the top-|P| planning problem, then $p^\Gamma$ is a solution to the top-|$P^\Gamma$| planning problem.

By way of proof, let $\pi\in P^\Gamma$ be some plan for $\Pi$. Since $\Gamma$ is a group, there exists $\sigma\in\Gamma$ such that $\sigma(\pi)\in P$. Since P is a solution to the top-|P| planning problem, if there exists a plan $\pi'$ for $\Pi$ with cost($\pi'$)<cost($\pi$)=cost($\sigma(\pi)$), then $\pi'\in P$ and thus $\pi'\in P^\Gamma$.

Similarly, but more generally, define the closure of a graph G=(N, E) under $\Gamma$ as a graph $G^\Gamma$=(N', E'), where $N'=N^\Gamma$={$\sigma(n)|\sigma\in\Gamma, n\in N$} the closure of N under $\Gamma$ and E'={($\sigma(n), \sigma(n'))|\sigma\in\Gamma$, (n, n')$\in$E}.

Now consider Theorem 5. Let $\Pi$ be a planning task, $\Gamma$ be a symmetry group of $\Pi$ and P be a set of $\Pi$'s plans. Then $G(P)^\Gamma$=$G(P^\Gamma)$.

By way of proof, first, show that $G(P)^\Gamma \subseteq G(P^\Gamma)$. Let (u, v) be some edge in $G(P)^\Gamma$. Thus u=$\sigma(u')$ and v=$\sigma(v')$ for some $\sigma\in\Gamma$ and edge (u', v')$\in$G(P). Let $\pi'\in P$ be some plan that traverses the edge (u', v'). Then $\pi$=$\sigma(\pi')$ is a plan, and it traverses (u, v). Further, $\pi$ is in $P^\Gamma$, and thus (u, v)$\in G(P^\Gamma)$. For the other direction, let (u, v) be some edge in $G(P^\Gamma)$. Then, (u, v) is traversed by some plan $\pi\in P^\Gamma$. Thus, there exist $\sigma\in\Gamma$ and $\pi'\in P$ such that $\pi$=$\sigma(\pi')$. Thus, ($\sigma^{-1}(u)$, $\sigma^{-1}(v)$) is traversed by the plan $\pi'$, giving us ($\sigma^{-1}(u)$, $\sigma^{-1}(v)$)$\in$G(P). Therefore, by the definition of $G(P)^\Gamma$ we have (u, v)$\in G(P)^\Gamma$.

Theorems 4 and 5 above allow safely extending the graph G(P) with symmetries by taking its closure under the symmetries that stabilize the initial state. That way, methods extending a set of plans can include a reduction of plan actions order or a symmetry based extension or both.

FIG. 5 depicts an extension with symmetries of the example plan for the GRIPPER task with four balls (a fragment). In particular, FIG. 5 depicts (part of) the graph obtained by extending the example gripper task plan with structural symmetries. The structural symmetries found on this task are between balls and between arms, i.e., all balls are symmetric to each other, and the two arms are symmetric. Note though, that not all optimal plans are symmetric to each other. For instance, the example plan $\pi_0$=pick($b_1$, L)pick($b_2$, R)move(A, B)drop($b_1$, L)drop($b_2$, R)move(B, A) pick($b_3$, L)pick($b_4$, R)move(A, B)drop($b_3$, L)drop($b_4$, R) is not symmetric to the plan $\pi_1$=pick($b_1$, L)pick($b_2$, R)move(A, B) drop($b_1$, L)drop($b_2$, R)move(B, A)pick($b_3$, L)pick($b_4$, R)move(A, B) drop($b_4$, R)drop($b_3$, L) (the last two actions reordered), since there is no composition of symmetries that permute balls and arms that can map between the two plans. However, when permuting ball3 with ball4 and arms together, obtain the plan $\pi_2$=pick($b_1$, R)pick($b_2$, L)move(A, B)drop($b_1$, R)drop($b_2$, L)move(B, A) pick($b_4$, R)pick($b_3$ L)move(A, B)drop($b_4$, R)drop($b_3$, L). Both this $\pi_2$ and $\pi_0$, if followed through up to the last two actions, end up in the same state. Thus, adding both $\pi_0$ and $\pi_2$ to G(P), allows us to extract $\pi_1$, as it follows $\pi_0$ for the first nine actions and $\pi_2$ for the last two. All optimal plans for the example task can be obtained this way and therefore the graph encodes all optimal plans for this task.

Repeatedly Forbidding Multiple Plans

Consider repeatedly forbidding multiple plans. Having introduced the graph G(P) as compact representation of a set of plans P and having clarified how to extract plans from G(P), a reformulation is now devised that forbids all plans represented by G(P). Refer to Definition 5 of FIG. 12. In what follows, for the sake of convenience, G(P) is sometimes treated as the set of plans that can be derived from G(P), such plans being denoted by $\pi\in G(P)$. The skilled artisan will appreciate this from the context. Further, by O(G(P)) is denoted the set of all actions in P. These are exactly the actions labeling the edges of G(P). Finally, by $E^o$ is denoted the subset of edges that are induced by the action o, and each action instance that corresponds to the edge (s, t) is denoted by $o_{(s,t)}$. The plan forbidding reformulation presented in the previous section is now extended to forbid all plans in G(P). Refer to Definition 6 of FIG. 13.

The planning task of $\Pi_G^-$ forbids all sequences of actions $\pi \in G$ from being a plan, accepting all other plans of $\Pi$. Similarly to the case of a single plan, the variable $\bar{v}$ starts from the value 1 and switches to 0 when the sequence of actions applied is not a prefix of $\pi$. Once a value 0 is reached, it cannot be switched back to 1. The actions $o^1$ and $o^2$ are the copies of actions in $\pi$ for the cases when $\pi$ is already discarded from consideration (variable $\bar{v}$ has already switched its value to 0) and for discarding $\pi$ from consideration (switching $\bar{v}$ to 0). In case there are multiple appearances of an action $o$ in G, $o^2$ requires all the corresponding variables $\bar{v}_s$ for each edge (s, t) in E that is induced by $o$ to have the value 0. Thus, $o^2$ will be applicable only in states that are different from the states resulting from applying the prefix of some plan $\pi \in G$ up to $o$ in the initial state. Note that $o^3_{(s,t)}$ are copies of the corresponding action $o$ along G, with a separate copy for each appearance of the same action $o$. These actions are responsible for following sequences $\pi \in G$ and are applicable while some such sequence is still followed.

Theorem 6 is now introduced. Let $\Pi$ be a planning task, P be some set of plans, and G:=G(P)=(N, E). The task $\Pi_G^-$ is a G-forbidding reformulation of $\Pi$.

By way of proof, let $r: O' \rightarrow O$ be the mapping defined by $r(o^e)=o$ and $r(o^1)=r(o^2)=r(o^3)=o$. Note that $\Pi_G^-$ restricted to the variables V equals to the task $\Pi$, modulo the three equal instances of the actions in G. Thus, for each plan $\pi$ for $\Pi_G^-$, $r(\pi)$ is a plan for $\Pi$.

Continuing the proof, for the second direction, since for each $o \in G$ at most one of the actions $o^1$, $o^2$, $o^3$ is applicable in each state s of $\Pi_G^-$, given a sequence of actions $\rho$ applicable in the initial state of $\Pi$, it can be mapped to an applicable in the initial state of $\Pi_G^-$ sequence of actions $\rho'$ such that $r(\rho')=\rho$, by choosing in each state the relevant representative out of $o^e$, $o^1$, $o^2$, and $o^3$. In other words, r restricted to applicable in the initial state sequences of actions is invertible, and its inverse mapping described above is denoted by $r^{-1}$.

Further continuing the proof, first, let $\pi=o_1 \ldots o_n$ be some plan in G and let $\pi'=r^{-1}(\pi)$ be the inverse of $\pi$. Then, $\pi'=s'_0 o_1^3 s_1 \ldots s_{n-1} o_n^3 s_n$, since at step i we have $\bar{v}=1$ and $\bar{v}_{s_{i-1}}=1$. Thus, after applying $\pi'$, the value of the variable $\bar{v}$ in $s_n$ remains 1, and thus $\pi'$ is not a plan for $\Pi_G^-$. Still continuing the proof, now, let $\rho$ be a plan for $\Pi$ such that $\rho \not\in G$. Let $o$ be the first action on $\rho$ that does not follow a path in G. In other words, there exists a prefix $\rho'=s_0 o_1 s_1 \ldots s_{m-1} o_m s_m$ of $\rho$ such that (i) $\rho'o$ is a prefix of $\rho$, (ii) $\rho'$ is a path in G, and (iii) $\rho'o$ is not a path in G. Then we have $r^{-1}(\rho')=o_1^3 \ldots o_m^3$, and since $o \neq o_{m+1}$, the next action on $r^{-1}(\rho)$ will not be $o_{m+1}^3$. If $o \in G$, then the next action will be $o^2$ (applicability of which is next shown), and otherwise it will be $o^e$, in both cases setting the value of $\bar{v}$ to 0. Thus, all the following actions $o'$ are mapped to either $o'^e$ or $o'^1$, and the preconditions of these actions are restricted to V and $\bar{v}=0$, the sequence of actions $r^{-1}(\rho)$ achieves the goal values on V and thus is a plan.

The proof is finalized by showing the applicability of $o^2$ in the state $s'_m := s'_0[[o_1^3 \ldots o'^e]]$ for $o \in G$ such that $o$ does not correspond to any edge $(s_m, t)$. Naturally, pre($o$) holds in $s'_m$. Further, since $s'_0[\bar{v}]=1$, $s'_0[\bar{v}_{s_0}]=1$, and $s'_0[\bar{v}_s]=0$ for all $s \in N \setminus \{s_0\}$, after applying $o_1^3 \ldots o_m^3$ obtain $s'_m[\bar{v}]=1$, $s'_m[\bar{v}_{s_m}]=1$, and $s'_m[\bar{v}_s]=0$ for all $s \in N \setminus \{s_m\}$. Since $o$ does not correspond to any edge $(s_m, t)$, for each $(s, t) \in E^o$ obtain $s'_m[\bar{v}_s]=0$, and thus $o^2$ is applicable in $s'_m$.

The exemplary IterativeTopKMultiple($\Pi$, k) algorithm illustrated in FIG. 14 works as follows. Once a plan is found, it is extended to a set of plans P and then to the graph G(P), which is forbidden in the next iteration. Further, the plans encoded by G(P) are extracted and partitioned into two sets, optimal plans T and non-optimal ones B. In the next iterations, the set T is extended with optimal plans T' from that iteration, as well as all plans of the same cost as those in T' from the set B. The algorithm is thus iterating until the set T consists of at least k plans or no more plans exist. In practice, however, the algorithm can be simplified if the graph G(P) encodes only plans of the same cost. The skilled artisan will appreciate that the algorithm illustrated in FIG. 14 provides an algorithmic scheme for solving top-k planning problems by iteratively reformulating a set of optimal plans in each iteration.

Experimental Evaluation

An experimental evaluation was carried out. In particular, in order to empirically evaluate the feasibility of an exemplary approach to finding top-k plans, according to an aspect of the invention, the iterative algorithm depicted in FIG. 14 was implemented on top of the Fast Downward planning system (see Helmert, M., 2006, The Fast Downward planning system, *Journal of Artificial Intelligence Research* 26:191-246, hereby expressly incorporated by reference herein in its entirety for all purposes), extended with the support for structural symmetries and the orbit space search algorithm (see Domshlak, C. et al., 2015, Symmetry breaking in deterministic planning as forward search: Orbit space search algorithm, Technical Report IS/IE-2015-03, Technion, Haifa; and Alkhazraji, Y. et al., 2014 Metis: Arming Fast Downward with pruning and incremental computation, in the 8th International Planning Competition (IPC-8): planner abstracts, 88-92, both hereby expressly incorporated by reference herein in their entireties for all purposes). As an underlying classical planner, an orbit space search was used, not stabilizing the initial state, with the LM-cut heuristic (see Helmert, M. and Domshlak, C, 2009, Landmarks, critical paths and abstractions: What's the difference anyway? in Proceedings of the 19th International Conference on Automated Planning and Scheduling (ICAPS 2009), 162-169, hereby expressly incorporated by reference herein in its entirety for all purposes), a state-of-the-art heuristic search planner. A natural candidate as a baseline for the comparison is the K* algorithm. Unfortunately, the only existing implementation of the K* algorithm for classical planning that is currently known to the inventors supports only the SPPL language. Therefore, in order to be able to compare to an existing method for deriving top-k plans, K* search was also implemented within the Fast Downward planning system. As K* requires a consistent heuristic, the iPDB heuristic (see Haslum, P. et al., 2007, Domain-independent construction of pattern database heuristics for cost-optimal planning. *In Proceedings of the 22nd AAAI Conference on Artificial Intelligence* (AAAI 2007), 1007-1012, hereby expressly incorporated by reference herein in its entirety for all purposes) was employed. Since iPDB may require a long pre-search computation time, the blind heuristic was also experimented with. An experimental benchmark suite includes all 1667 tasks from the optimal IPC STRIPS benchmarks. The experiments were performed on Intel® Xeon® CPU E7-8837 2.67 GHz, with time (memory) limit of 30 min (2 GB).

To measure the effect of various techniques for extending the set of existing plans the extension by symmetry was switched on and off (adding "S" to the configuration name if symmetry is switched on), and the two aforementioned approaches for plan reordering (Indep and Naive) were experimented with, as well as not reordering at all (None), giving in total six configurations for the iterative approach (None, Indep, Naïve, NoneS, IndepS, NaiveS) and two configurations for the K* approach (K*-blind, K*-iPDB). The experiments were performed with a large k value, namely k=10000, aiming at checking the feasibility of the suggested approaches for finding a large set of plans.

For a given task and a natural number k, the k-coverage is a value in {0, 1} assigning the value 1 if a solution to the top-k planning problem was found (or proven unsolvable), according to Definition 1, and 0 otherwise. In order to measure the effect of the number of required plans k, the k-coverage was computed for any value of k in [1, 10000], without rerunning the experiments for that value of k. A small value of k=10 was also experimented with, obtaining similar results for all configurations. Note that for the iterative configurations, there are only up to 10 tasks for each configuration that fail on memory, with most failures being due to timeouts. For K* based configurations, the opposite is true, with 12 and 68 timeouts for blind heuristic and iPDB, respectively.

FIG. 6 depicts the results for all configurations, summed over all tasks in the benchmark suite. The horizontal lines correspond to K* with iPDB heuristic (top 815) and the blind heuristic (bottom 813). Both K* configurations found all required plans within a short time window, and thus always either fail to find any plan or find all required ones. In contrast, the iterative approaches exhibit an anytime behavior. Further, since the iterative configurations exploit a better underlying classical planner, the k-coverage for smaller values of k is significantly higher for the iterative approaches than for the K* ones. Looking at the overall k-coverage, a clear dominance can be seen of NaiveS over all other configurations, up to k=4320. For k>4320, K* with iPDB has the best overall k-coverage. For specific domains, however, the picture might differ substantially. FIG. 6 thus presents the k-coverage as a function of the restriction on the number of required plans, for k≤10000.

Figures 15, 16:
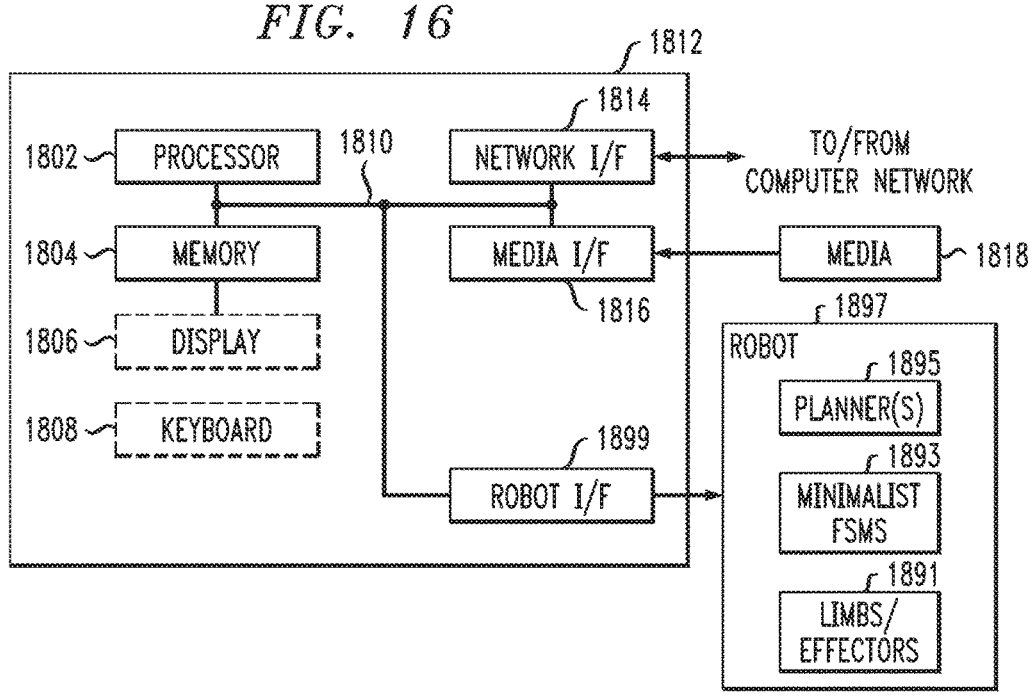
FIG. 15 is a table presenting per-domain k-coverage of the selected configurations for selected values of k, with average number of iterations in parentheses, according to an aspect of the invention.
FIG. 16 depicts a computer system that may be useful in implementing one or more aspects and/or elements of the invention.

The table of FIG. 15 shows the per-domain k-coverage results on selected configurations, namely IndepS and NaiveS for the iterative approach and both K* configurations for four values of k, namely k=10, 100, 1000, 10000. The first two columns depict the k-coverage of the two iterative configurations for k=10, the next two for k=100 and the next two for k=1000. The last block of four columns shows the k-coverage of all four selected configurations for k=10000. As mentioned above, the K* configurations (two rightmost columns) perform similarly with all values of k≤10000 and thus are shown once. Thus, the table of FIG. 15 shows per-domain k-coverage of selected configurations for selected values of k, with the average number of iterations in parentheses.

First, looking at the rightmost part, corresponding to k=10000, note that there is no clear advantage to either of the approaches across the domains. K* achieves better performance in 23 domains out of 57, while the iterative approach performs better in 28 domains. Further, there is often a large difference in coverage between the two approaches, to one side and to another, making them complementary. Within each approach, there is a clear advantage to one of the configurations. For the iterative approach, with the exception of the MICONIC domain, NaiveS performs at least as good as IndepS, performing strictly better in 37 domains. This dominance is preserved for smaller k values, with strict dominance in 39 domains for k=1000, in 25 domains for k=100, and 10 for k=10. NaiveS loses to IndepS only in the MICONIC domain, for k>10. For the K* based approach, there are two domains where the blind search performs better than iPDB, namely AIRPORT and TETRIS, and performs strictly worse in 10 domains. Note that there are 45 domains with equal k-coverage for the two K* based approaches.

Moving on to smaller k values, note that for k=1000 the dominance shifts further towards the iterative approach, with 34 domains vs. 17 domains for K*. For k=100 it becomes 43 domains vs. 10 domains. For k=10, the iterative approach always performs at least as good as K*, achieving better performance on 54 out of 57 domains.

Looking at some non-IPC domains, note that these were modelled with planner efficiency in mind. For the iterative approach, the number of plans found and forbidden per iteration is typically 1, and therefore the number of plans found within the time and memory restrictions is typically low. K*, on the other hand, even with the blind heuristic performs extremely well on these domains, solving all tasks for k=10000 in all but the risk management domain. On this domain, it finds all 10000 requested top plans in 133 out of 200 tasks, failing to find any plans on the other 67 tasks.

One or more embodiments thus provide a novel approach to the problem of top-k planning, based on iterative computation of optimal solutions, exploiting existing optimal planners. Two exemplary techniques for deriving additional solutions from previously found ones are disclosed. To empirically evaluate the feasibility of one or more embodiments, an experiment implemented an existing approach to top-k planning, K*, on top of a state-of-the-art planner. These techniques are complementary in their performance, with K* being more beneficial for extremely large values of k.

One or more embodiments assume an artificial intelligence (AI) planning problem is given including of a set of actions, initial state and a goal condition. Given the planning problem, one or more embodiments generate a set of top-k plans. Further, one or more embodiments employ a linear cost metric and have algorithms to find the optimal plan, or more specifically top-k plans based on this metric. In addition, at least some embodiments use techniques other than hierarchical clustering techniques on the already existing plans in the database to formulate or derive a new plan. One or more techniques described herein can be used for the hypothesis generation problem, as well as many other applications. In at least some embodiments, rather than finding a representative set of plans that are diverse from each other, top-k plans are computed based on some notion of quality of plans. In particular, one or more embodiments provide a formulation of the top-k planning problem for cost-optimal planning. The top-k planning problem is defined as the problem of finding a set of k distinct plans with lowest cost. This set can contain both optimal plans and near-optimal plans, depending on k, and, by definition, for each plan in this set all valid plans of lower cost must also be in the set.

Recapitulation

Given the discussion thus far, and referring generally to FIGS. 1, 8, and 14, it will be appreciated that, in general terms, an exemplary method, according to an aspect of the invention, includes obtaining a specification of a planning problem in a planning language (e.g., PDDL, STRIPS, SAS+, and/or ADL); obtaining, in a first iteration, at least one solution to the planning problem (e.g., step 301); modifying, in the first iteration, the planning problem to forbid the at least one solution (e.g. step 305); and repeating the obtaining of the at least one solution and the modifying to forbid the at least one solution, for a plurality of additional iterations, after the first iteration, until a desired number, k, of solutions to the planning problem is found or until no further solutions exist, whichever comes first (decision block 307, e.g.).

It will be appreciated that the exemplary method provides a method for top-k planning and a method that when executed by at least one hardware processor solving a top-k planning problem, inherently improves the performance (of a software agent carrying out the planning and thus of a processor running same), as demonstrated by FIGS. 6 and 15, for example. The initial iteration and repeated steps (i.e. additional iterations) are carried out by the at least one processor and the specification is obtained in a memory coupled to the at least one processor. See generally discussion of FIG. 16.

In one or more embodiments, the at least one solution found includes the optimal solution, and/or the at least one solution forbidden includes the optimal solution.

In one or more embodiments, the method further includes, for the first iteration and each of the additional iterations, extending the obtained optimal solution to an extended set of solutions including the optimal solution, as per step 303. The modifying of the planning problem to forbid thus includes modifying the planning problem to forbid the extended set of solutions.

Aspects of the invention can be used in many different scenarios. One example is control of industrial robots or the like. Thus, in one or more embodiments, plans are used for task planning for robots. The skilled artisan will appreciate that for a robot to pick up a cup from a table, several micro-actions (e.g., joint and motor movements) will typically need to be performed. In one or more embodiments, planning is not carried out at the level of joint and motor movements, but rather on the level of macro-actions such as "move from Point A to Point B"; "use the arm to pick up object Z"; and the like. The robot is provided with high level plan generated using aspects of the invention and the robot then translates that plan into micro-actions. Reference is made to Torsten Jandt et al., "b-it-bots RoboCup@Work Team Description Paper," 20th RoboCup International Symposium, Leipzig, Jun. 30-Jul. 4, 2016, the complete disclosure of which is hereby expressly incorporated herein by reference in its entirety for all purposes. As disclosed therein, the existing finite state machines (FSMs) are refactored to very small and clear state machines covering only basic actions, such as move-to-location, perceive-object, grasp-object or place-object. For a particular task, the planner then generates a sequence of those actions in order to achieve the overall goal. The plan is executed and monitored. In case of a failure during one of the actions, replanning is triggered and a new plan is generated based on the current information available in the knowledge base.

Significantly, the use of top-k plans is highly advantageous in real-world/non-deterministic applications. For example, suppose a robot tries to place shielding material to stop a leak at an industrial accident scene. Suppose the first plan employed calls for the robot to move along a certain path, but once the robot is on-site, it is discovered that this path is blocked and the blockage cannot readily be removed by the robot. The robot can now switch to a different one of the top k plans, which does not require traversing the blocked path. Thus, in some instances, in the step of obtaining the specification of the planning problem in the planning language, the specification specifies a problem in automated control of an industrial robot, and the method further includes operating the industrial robot in accordance with the k solutions to the planning problem.

In one or more embodiments, the solutions are formulated as action sequences implemented by state machines covering basic actions. In some such embodiments, an additional step includes ceasing a first one of the k solutions upon unfeasibility and implementing another of the k solutions in response to the unfeasibility. This is especially useful when the industrial robot operates in a non-deterministic environment, i.e., where it cannot be known a priori that a given plan is feasible due, e.g., to unforeseen conditions (say, robot's path blocked by debris).

Various techniques can be used to extend the obtained optimal solution. In some cases, this is accomplished by re-ordering the actions in the plan (i.e. same actions in a different order); there are several ways to accomplish this (e.g., "Indep." and "Naive"). Accordingly, in some instances, the extending of the obtained (e.g., optimal) solution to the extended set of solutions includes re-ordering by: following an order of operators in the obtained optimal solution; pairwise gathering independent ones of the operators into the set as long as possible; and starting a new set whenever a non-independent one of the operators is met.

In some cases, structural symmetry is employed to obtain different plans with different actions. Accordingly, in some instances, the extending of the obtained optimal solution to the extended set of solutions includes adding to the extended set of solutions new set members symmetric to already existing set members. The set members symmetric to the already existing set members include set members resulting from mapping the existing set members with structural symmetries.

Regarding the forbidding aspect, in one or more embodiments, it is ensured that if the plan it is desired to forbid is followed, the goal state is not achieved. That is, if the sequence of actions (and only the sequence of actions) in the plan to be forbidden is followed, the end result will not be the goal state. In essence, the system is "tricked"—the reformulation is a new planning task in which there are additional or modified actions/variables. It is now necessary to deviate from the plan to be forbidden in order to end up in the goal state. Thus, in some instances, the step of modifying to forbid, in the first iteration and the plurality of additional iterations, includes reformulation such that following a given solution to be forbidden does not result in reaching a desired goal state.

In some cases, the step of obtaining the optimal solution to the planning problem is carried out with two or more different planning routines in different iterations.

In another aspect, an exemplary computer system (e.g., for controlling an industrial robot by solving a top-k planning problem) includes a memory; an interface 1899 (discussed below) to the industrial robot; and at least one processor, coupled to the memory and the interface, and operative to carry out or otherwise facilitate any one, some, or all of the method steps disclosed herein. Once the top-h plans are obtained, the at least one processor is operative to provide a signal to the interface to cause the industrial robot to operate in accordance with the k solutions to the planning problem. In one or more embodiments, the interface is provided to a robot controlled by action sequences implemented by state machines covering basic actions, such that the top-k solutions are formulated as action sequences implemented by the state machines covering the basic actions.

Advantageously, in at least some instances, the at least one processor is further operative to cause ceasing of a first one of the k solutions upon unfeasibility and implementation another of the k solutions in response to the unfeasibility.

Thus, finding the top-k plans using embodiments of the invention improves the performance of the industrial robot; for example, by providing back-up plans when a primary plan is not feasible, as discussed elsewhere herein.

Exemplary System

As will be appreciated by one skilled in the art, and as discussed in detail elsewhere herein, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects.

One or more embodiments of the invention, or elements thereof, can be implemented in the form of an apparatus including a memory and at least one processor that is coupled to the memory and operative to perform exemplary method steps.

One or more embodiments can make use of software running on a processor of a robot, robot controller, and/or general purpose computer or workstation. With reference to FIG. 16, such an implementation might employ, for example, a processor 1802, a memory 1804, and an input/output interface formed, for example, by a display 1806 and a keyboard 1808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1802, memory 1804, and input/output interface such as display 1806 and keyboard 1808 can be interconnected, for example, via bus 1810 as part of a data processing unit 1812. Suitable interconnections, for example via bus 1810, can also be provided to a network interface 1814, such as a network card, which can be provided to interface with a computer network, and to a media interface 1816, such as a diskette or CD-ROM drive, which can be provided to interface with media 1818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1802 coupled directly or indirectly to memory elements 1804 through a system bus 1810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1808, displays 1806, pointing devices, and the like) can be coupled to the system either directly (such as via bus 1810) or through intervening I/O controllers (omitted for clarity).

Network adapters such as network interface 1814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1812 as shown in FIG. 16) running a server program. It will be understood that such a physical server may or may not include a display and keyboard.

As noted above, aspects of the invention can be used in many different scenarios; one non-limiting example is control of industrial robots or the like (e.g., robot 1897). Reference is again made to the Torsten Jandt et al. paper "b-it-bots RoboCup@Work Team Description Paper." The robot 1897, in addition to limbs, effectors (e.g. grippers or the like), and so on, includes minimalist finite state machines (FSMs) 1893 wherein FSMs are refactored to very small and clear state machines covering only basic actions, such as move-to-location, perceive-object, grasp-object or place-object. For a particular task, the planner 1895 then generates a sequence of those actions in order to achieve the overall goal. These minimalist FSMs are, in essence, a description of the capabilities of the limbs, effectors, or the like. Typically, in the field of robotics, a single very large FSM is created, which encodes all the robot's possible behaviors. In order to use a planner instead of such a very large FSM, one or more embodiments factor the large FSM into smaller FSMs that correspond to individual actions. In this way, a planner can be used to find the actual behavior, using, e.g., top-k planning techniques disclosed herein.

Note that system 1812 communicates with robot 1897 via interface 1899 (e.g. wired such as USB and/or wireless such as Bluetooth). Functionality can be as described (e.g. find top-k plans on system 1812 and provide to robot 1897 via interface 1899) or can be different; for example, some or all of the top-k planning could be done on the robot 1897.

It should be noted that any of the methods described herein can include an additional step of providing a system comprising distinct software modules embodied on a computer readable storage medium; the modules can include, for example, any or all of the elements depicted in the block diagrams and/or described herein. For example, referring again to FIG. 1, a main routine or module can implement the overall logic of the flow chart therein, calling subroutines or modules for the other functions. One or more optimal planners as described herein are included in a subroutine or module implementing step 301. Step 303 is carried out, for example, by a subroutine or module implementing the logic set forth in the "Devising Additional Plans" section herein. Step 305 is carried out, for example, by a subroutine or module implementing the logic set forth in the "Repeatedly Forbidding Plans" and "Repeatedly Forbidding Multiple Plans" sections herein. The method steps can then be carried out using the distinct software modules/routines and/or sub-modules/subroutines of the system, as described above, executing on one or more hardware processors 1802. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving performance of at least one hardware processor solving a top-k planning problem, said method comprising:

obtaining, in a memory coupled to the at least one processor, a specification of the planning problem in a planning language;

obtaining, in a first iteration carried out by said at least one processor, at least one solution to said planning problem;

modifying, in said first iteration carried out by said at least one processor, said planning problem to forbid said at least one solution; and repeating, by said at least one processor, said obtaining of said at least one solution and said modifying to forbid said at least one solution, for a plurality of additional iterations, after said first iteration, until a desired number, k, of solutions to said planning problem are found or until no further solutions exist, whichever comes first;

wherein:

in said step of obtaining said at least one solution in said first iteration and said plurality of additional iterations, said at least one solution comprises an optimal solution; and said step of modifying, in said first iteration and said plurality of additional iterations, comprises modifying to forbid said optimal solution;

at least one forbidden solution of the at least one solution comprises a different set of actions than an unforbidden solution of the at least one solution;

further comprising, for said first iteration and each of said additional iterations, extending said obtained optimal solution to an extended set of solutions including said optimal solution, wherein said modifying of said planning problem to forbid comprises modifying said planning problem to forbid said extended set of solutions;

wherein, in said step of obtaining said specification of said planning problem in said planning language, said specification specifies a problem in automated control of an industrial robot, further comprising operating said industrial robot in accordance with said k solutions to said planning problem and wherein said extending of said obtained optimal solution to said extended set of solutions comprises adding to said extended set of solutions new set members symmetric to already existing set members, wherein said set members symmetric to said already existing set members comprise set members resulting from mapping said existing set members with structural symmetries.

2. The method of claim 1, wherein said solutions are formulated as action sequences implemented by state machines covering basic actions.

3. The method of claim 2, wherein said industrial robot operates in a non-deterministic environment, further comprising ceasing a first one of said k solutions upon unfeasibility and implementing another of said k solutions in response to said unfeasibility.

4. The method of claim 1, wherein said extending of said obtained optimal solution to said extended set of solutions comprises re-ordering actions in said obtained optimal solution.

5. The method of claim 4, wherein said re-ordering comprises:

following an order of operators in said obtained optimal solution;

pairwise gathering independent ones of said operators into said set as long as possible; and starting a new set whenever a non-independent one of said operators is met.

6. The method of claim 1, wherein said step of modifying to forbid, in said first iteration and said plurality of additional iterations, comprises reformulation such that following a given solution to be forbidden does not result in reaching a desired goal state.

7. The method of claim 1, wherein, in said step of obtaining said specification, said planning language comprises at least one of PDDL, STRIPS, SAS+, and ADL.

8. The method of claim 1, wherein said step of obtaining said optimal solution to said planning problem is carried out with different planning routines in different ones of said iterations.

9. A non-transitory computer readable medium comprising computer executable instructions which when executed by a computer cause the computer to perform a method for improving performance of at least one hardware processor solving a to p-k planning problem, said method comprising:

obtaining, in a memory coupled to the at least one processor, a specification of the planning problem in a planning language;

obtaining, in a first iteration carried out by said at least one processor, at least one solution to said planning problem;

modifying, in said first iteration carried out by said at least one processor, said planning problem to forbid said at least one solution;

repeating, by said at least one processor, said obtaining of said at least one solution and said modifying to forbid said at least one solution, for a plurality of additional iterations, after said first iteration, until a desired number, k, of solutions to said planning problem are found or until no further solutions exist, whichever comes first; and ceasing a first one of said k solutions upon unfeasibility and implementing another of said k solutions in response to said unfeasibility;

wherein:

in said step of obtaining said at least one solution in said first iteration and said plurality of additional iterations, said at least one solution comprises an optimal solution; and said step of modifying, in said first iteration and said plurality of additional iterations, comprises modifying to forbid said optimal solution;

at least one forbidden solution of the at least one solution comprises a different set of actions than an unforbidden solution of the at least one solution;

further comprising, for said first iteration and each of said additional iterations, extending said obtained optimal solution to an extended set of solutions including said optimal solution, wherein said modifying of said planning problem to forbid comprises modifying said planning problem to forbid said extended set of solutions;

wherein, in said step of obtaining said specification of said planning problem in said planning language, said specification specifies a problem in automated control of an industrial robot, further comprising operating said industrial robot in accordance with said k solutions to said planning problem and wherein said extending of said obtained optimal solution to said extended set of solutions comprises adding to said extended set of solutions new set members symmetric to already existing set members, wherein said set members symmetric to said already existing set members comprise set members resulting from mapping said existing set members with structural symmetries.

10. A computer system for controlling an industrial robot by solving a top-k planning problem, said computer system comprising:

a memory;

an interface to the industrial robot; and at least one processor, coupled to said memory and said interface, and operative to:

obtain a specification of the planning problem in a planning language;

obtain, in a first iteration, at least one solution to said planning problem;

modify, in said first iteration, said planning problem to forbid said at least one solution, wherein at least one forbidden solution of the at least one solution comprises a different set of actions than an unforbidden solution of the at least one solution;

repeat said obtaining of said at least one solution and said modifying to forbid said at least one solution, for a plurality of additional iterations, after said first iteration, until a desired number, k, of solutions to said planning problem are found or until no further solutions exist, whichever comes first;

cease a first one of said k solutions upon unfeasibility and implementing another of said k solutions in response to said unfeasibility; and wherein, in said obtaining said specification of said planning problem in said planning language, said specification specifies a problem in automated control of the industrial robot, the processor further operative to provide a signal to said interface to cause said industrial robot to operate in accordance with said k solutions to said planning problem, and wherein said extending of said obtained optimal solution to said extended set of solutions comprises adding to said extended set of solutions new set members symmetric to already existing set members, wherein said set members symmetric to said already existing set members comprise set members resulting from mapping said existing set members with structural symmetries.

11. The system of claim 10, wherein:

in said first iteration and said plurality of additional iterations, said at least one solution comprises an optimal solution; and said modifying, in said first iteration and said plurality of additional iterations, comprises modifying to forbid said optimal solution.

12. The system of claim 11, wherein said at least one processor is further operative, for said first iteration and each of said additional iterations, to extend said obtained optimal solution to an extended set of solutions including said optimal solution, wherein said modifying of said planning problem to forbid comprises modifying said planning problem to forbid said extended set of solutions.

13. The system of claim 12, wherein said solutions are formulated as action sequences implemented by state machines covering basic actions.

* * * * *